(12) United States Patent
Contzen et al.

(10) Patent No.: US 9,676,168 B2
(45) Date of Patent: Jun. 13, 2017

(54) FIRE BARRIER LAYER AND FIRE BARRIER FILM LAMINATE

(71) Applicant: Lamart Corporation, Clifton, NJ (US)

(72) Inventors: Bernard Roger Contzen, Auderghem (BE); Gene Jung, Livingston, NJ (US); Gary Shank, Belleville, NJ (US); Robert C Rioux, Amherst, NY (US); Kenneth B Miller, Lockport, NY (US); Phillip Faria, Clifton, NJ (US)

( * ) Notice: Subject to any disclaimer, the term of this patent is extended or adjusted under 35 U.S.C. 154(b) by 752 days.

(21) Appl. No.: 13/802,537

(22) Filed: Mar. 13, 2013

(65) Prior Publication Data

US 2013/0196136 A1 Aug. 1, 2013

Related U.S. Application Data

(63) Continuation-in-part of application No. 13/299,399, filed on Nov. 18, 2011.

(Continued)

(51) Int. Cl.
*B32B 27/08* (2006.01)
*B32B 5/02* (2006.01)
(Continued)

(52) U.S. Cl.
CPC ............. *B32B 27/08* (2013.01); *B32B 3/04* (2013.01); *B32B 5/028* (2013.01); *B32B 27/12* (2013.01); *B32B 27/28* (2013.01); *B32B 27/281* (2013.01); *B32B 27/30* (2013.01); *B32B 27/34* (2013.01); *B32B 27/36* (2013.01); *B32B 37/02* (2013.01); *B32B 37/12* (2013.01); *B32B 2038/0092* (2013.01); *B32B 2255/00* (2013.01); *B32B 2255/10* (2013.01); *B32B 2307/102* (2013.01);
(Continued)

(58) Field of Classification Search
CPC ... D04H 1/42; D04H 3/16; D04H 1/54; E04C 2/043; A61F 13/534; D04B 21/12; D04B 21/10; D04B 2403/0213; B01F 15/02; B28B 13/022; C04B 35/83; B32B 15/08; B32B 27/00; B60C 23/0493; B65C 9/265; B65C 70/08; C09J 5/06; A44C 21/00; B05D 7/54; B29C 39/10
USPC ................. 428/219; 442/1; 156/60, 280
See application file for complete search history.

(56) References Cited

U.S. PATENT DOCUMENTS 3,404,061 A 10/1968 Shane et al.
3,434,917 A 3/1969 Kraus et al.
(Continued)

FOREIGN PATENT DOCUMENTS

DE 3624736 1/1988
EP 0736373 A1 9/1996
(Continued)

OTHER PUBLICATIONS

A paper presented at the 2004 Fire and Cabin Safety Research Conference, by Alain Jacques and Nicolas Orance of Cogebi, entitled "Development of a Thermal/ Acoustic Insulating Blanket Responding to the FAR25.856 by the Integration of Mica Flame Barrier".

(Continued)

*Primary Examiner* — Tahseen N Khan
(74) *Attorney, Agent, or Firm* — Ira Hammer

(57) ABSTRACT

A fire barrier laminate is provided for use in thermal and acoustical insulation systems, such as, but not limited to, those used in commercial aircraft.

19 Claims, 11 Drawing Sheets

Fire Barrier Layer and Fire Barrier Film Laminate

Related U.S. Application Data

(60) Provisional application No. 61/616,323, filed on Mar. 27, 2012, provisional application No. 61/415,552, filed on Nov. 19, 2010.

(51) Int. Cl.
| | |
|---|---|
| *B32B 27/34* | (2006.01) |
| *B32B 27/36* | (2006.01) |
| *B32B 27/28* | (2006.01) |
| *B32B 27/30* | (2006.01) |
| *B32B 27/12* | (2006.01) |
| *B32B 37/02* | (2006.01) |
| *B32B 3/04* | (2006.01) |
| B32B 37/12 | (2006.01) |
| B32B 38/00 | (2006.01) |
| E04B 1/94 | (2006.01) |
| B64C 1/40 | (2006.01) |
| B64D 45/00 | (2006.01) |

(52) U.S. Cl.
CPC ............... *B32B 2307/304* (2013.01); *B32B 2307/3065* (2013.01); *B32B 2307/718* (2013.01); *B32B 2307/7265* (2013.01); *B32B 2605/00* (2013.01); *B32B 2605/18* (2013.01); *B64C 1/40* (2013.01); *B64D 2045/009* (2013.01); *E04B 1/941* (2013.01); *Y10T 428/249921* (2015.04); *Y10T 428/2991* (2015.01); *Y10T 428/3154* (2015.04); *Y10T 428/31504* (2015.04); *Y10T 428/31721* (2015.04); *Y10T 428/31725* (2015.04); *Y10T 428/31786* (2015.04); *Y10T 428/31855* (2015.04); *Y10T 442/10* (2015.04)

(56) References Cited

U.S. PATENT DOCUMENTS

| | | |
|---|---|---|
| 3,458,329 A | 7/1969 | Hatch et al. |
| 3,567,162 A | 3/1971 | Lea et al. |
| 3,618,753 A | 11/1971 | Glasspoole |
| 3,873,409 A | 3/1975 | Jehier |
| 4,060,451 A | 11/1977 | Uchiyama |
| 4,255,483 A | 3/1981 | Byrd et al. |
| 4,310,587 A | 1/1982 | Beaupre |
| 4,600,634 A | 7/1986 | Langer |
| 4,746,403 A | 5/1988 | Ko et al. |
| 4,756,959 A | 7/1988 | Ito et al. |
| 4,943,473 A | 7/1990 | Sahatjian et al. |
| 4,961,991 A | 10/1990 | Howard |
| 5,108,821 A | 4/1992 | Dooley et al. |
| 5,116,537 A | 5/1992 | Yang |
| RE34,020 E | 8/1992 | Briggs et al. |
| 5,139,615 A | 8/1992 | Conner |
| 5,149,518 A | 9/1992 | Mercuri et al. |
| 5,167,876 A | 12/1992 | Lem et al. |
| 5,176,794 A | 1/1993 | Conner |
| 5,284,700 A | 2/1994 | Strauss et al. |
| 5,332,699 A | 7/1994 | Olds et al. |
| 5,336,348 A | 8/1994 | Mindler |
| 5,389,435 A | 2/1995 | Yap |
| 5,418,050 A | 5/1995 | Keefover-Ring et al. |
| 5,460,864 A | 10/1995 | Heitkamp |
| 5,496,640 A | 3/1996 | Bolton et al. |
| 5,585,312 A | 12/1996 | Teneyck et al. |
| 5,595,817 A | 1/1997 | Schafer et al. |
| 5,654,063 A | 8/1997 | Kirk et al. |
| 5,714,421 A | 2/1998 | Olds et al. |
| 5,759,659 A | 6/1998 | Sanocki et al. |
| 5,811,180 A * | 9/1998 | Berdahl .............. C09D 5/18 428/324 |
| 5,811,360 A | 9/1998 | Jubb |
| 5,821,183 A | 10/1998 | Jubb |
| 5,851,663 A | 12/1998 | Parsons et al. |
| 5,874,375 A | 2/1999 | Zoitos et al. |
| 5,928,075 A | 7/1999 | Miya et al. |
| 5,942,330 A | 8/1999 | Kelley |
| 5,955,177 A | 9/1999 | Sanocki et al. |
| 5,955,389 A | 9/1999 | Jubb |
| 5,981,072 A | 11/1999 | Mercuri et al. |
| 6,022,914 A | 2/2000 | Nowak et al. |
| 6,025,288 A | 2/2000 | Zoitos et al. |
| 6,030,910 A | 2/2000 | Zoitos et al. |
| 6,112,488 A | 9/2000 | Olson et al. |
| 6,128,874 A | 10/2000 | Olson et al. |
| 6,143,819 A | 11/2000 | Nakanishi |
| 6,265,333 B1 | 7/2001 | Dzenis et al. |
| 6,271,156 B1 | 8/2001 | Gleason et al. |
| 6,312,561 B1 | 11/2001 | Forsten |
| 6,322,022 B1 | 11/2001 | Fay et al. |
| 6,358,591 B1 | 3/2002 | Smith |
| 6,365,267 B1 | 4/2002 | Langer et al. |
| 6,551,951 B1 | 4/2003 | Fay et al. |
| 6,565,040 B2 | 5/2003 | Fay et al. |
| 6,579,396 B2 | 6/2003 | Erb |
| 6,627,561 B1 | 9/2003 | Wulliman |
| 6,670,291 B1 | 12/2003 | Tompkins |
| 6,694,804 B1 | 2/2004 | Roelofs |
| 6,861,381 B1 | 3/2005 | Jubb |
| 6,884,321 B2 | 4/2005 | Erb |
| 6,953,757 B2 | 10/2005 | Zoitos et al. |
| 6,991,845 B2 | 1/2006 | Levit |
| 7,153,796 B2 | 12/2006 | Jubb et al. |
| 7,259,118 B2 | 8/2007 | Jubb et al. |
| 7,399,379 B2 | 7/2008 | Levit |
| 7,632,766 B2 | 12/2009 | Erb et al. |
| 7,658,983 B2 | 2/2010 | Mormont |
| 7,767,597 B2 | 8/2010 | Garvey |
| 7,803,729 B2 | 9/2010 | Keller et al. |
| 8,026,190 B2 | 9/2011 | Keller et al. |
| 2003/0099833 A1 | 5/2003 | Erb et al. |
| 2004/0132364 A1 | 7/2004 | Wulliman et al. |
| 2005/0126441 A1 | 6/2005 | Skelhorn |
| 2006/0068186 A1 | 3/2006 | Leclercq |
| 2006/0284014 A1 | 12/2006 | Muller et al. |
| 2007/0018042 A1 | 1/2007 | Muller et al. |
| 2008/0014422 A1 | 1/2008 | Keller et al. |
| 2008/0166937 A1* | 7/2008 | Garvey .................. B32B 27/10 442/1 |
| 2009/0026787 A1 | 1/2009 | Muller et al. |
| 2009/0140097 A1 | 6/2009 | Collier et al. |
| 2009/0258180 A1 | 10/2009 | Goulet |
| 2010/0136280 A1 | 6/2010 | Mormont |
| 2010/0304152 A1* | 12/2010 | Clarke .................... B32B 5/26 428/438 |
| 2011/0014839 A1 | 1/2011 | Keller et al. |

FOREIGN PATENT DOCUMENTS

| | | |
|---|---|---|
| EP | 0 736 373 A1 | 10/1996 |
| EP | 1 086 470 B1 | 2/2003 |
| EP | 1 164 006 B1 | 8/2006 |
| WO | WO90/06847 | 6/1990 |
| WO | WO9906847 A1 | 6/1990 |
| WO | WO2005035895 A1 | 4/2005 |
| WO | WO2006111458 A1 | 10/2006 |
| WO | WO2008136875 A1 | 11/2008 |
| WO | WO2009052015 A2 | 4/2009 |
| WO | WO2009134299 A2 | 11/2009 |
| WO | WO2010123771 A1 * | 10/2010 |
| WO | WO2010123771 a1 | 10/2010 |

OTHER PUBLICATIONS

A paper by Khang D. Tran of the Mexmil Company, entitled "Light Weight Fire Barrier Materials for Aircraft Fuselage Thermal/Acoustical Insulation".

A paper by Ashwini K. Bendiganavale and Vinod C. Malshe, published in Recent Patents on Chemical Engineering, 2008, 1, 67-69, entitled "Infrared Reflective Inorganic Pigments".

(56) References Cited

OTHER PUBLICATIONS

International Search Report, Form PCT/ISA/210, mailed Jun. 4, 2012, for PCT International Patent Application No. PCT/US2011/061300.
Written Opinion, Form PCT/ISA/237, mailed Jun. 4, 2012, for PCT International Patent Application No. PCT/US2011/061300.
International Search Report, Form PCT/ISA/210, mailed May 23, 2012, for PCT International Patent Application No. PCT/US2011/061307.
Written Opinion, Form PCT/ISA/237, mailed May 23, 2012, for PCT International Patent Application No. PCT/US2011/061307.
International Search Report, Form PCT/ISA/210, mailed Apr. 12, 2012, for PCT International Patent Application No. PCT/US2011/061302.
Written Opinion, Form PCT/ISA/237, mailed Apr. 12, 2012, for PCT International Patent Application No. PCT/US2011/061302.
Alain Jacques and Nicolas Orance of Cogebi, Fire and cabin safety research "Development of an insulation Responding to the FAR25.856 by the Integration of Mica Flame Barrier". International Aircraft Materials Fire Test Working Group Meeting, Atlanta, Oct. 20, 2005.
Form PCT/ISA/220, dated Jul. 10, 2013 in International Application No. PCT/US2013/031099.
Information Disclosure Statement submitted in U.S. Appl. No. 13/299,399, Jul. 10, 2013.
Information Disclosure Statement submitted in U.S. Appl. No. 13/299,399, May 23, 2013.
Information Disclosure Statement submitted in U.S. Appl. No. 13/299,399, Jun. 20, 2012.
Information Disclosure Statement submitted in U.S. Appl. No. 13/299,399, Jan. 3, 2013.
Office Action mailed Jan. 2, 2014 in U.S. Appl. No. 13/299,399.
Office Action mailed Sep. 10, 2013 in U.S. Appl. No. 13/299,399.
Office Action mailed Feb. 14, 2013 in U.S. Appl. No. 13/299,399.
Information Disclosure Statement submitted in U.S. Appl. No. 13/707,999, Jul. 10, 2013.
Information Disclosure Statement submitted in U.S. Appl. No. 13/707,999, Dec. 13, 2013.
Office Action mailed Jan. 30, 2014 in U.S. Appl. No. 13/707,999.
Office Action mailed Oct. 17, 2013 in U.S. Appl. No. 13/707,999.

* cited by examiner

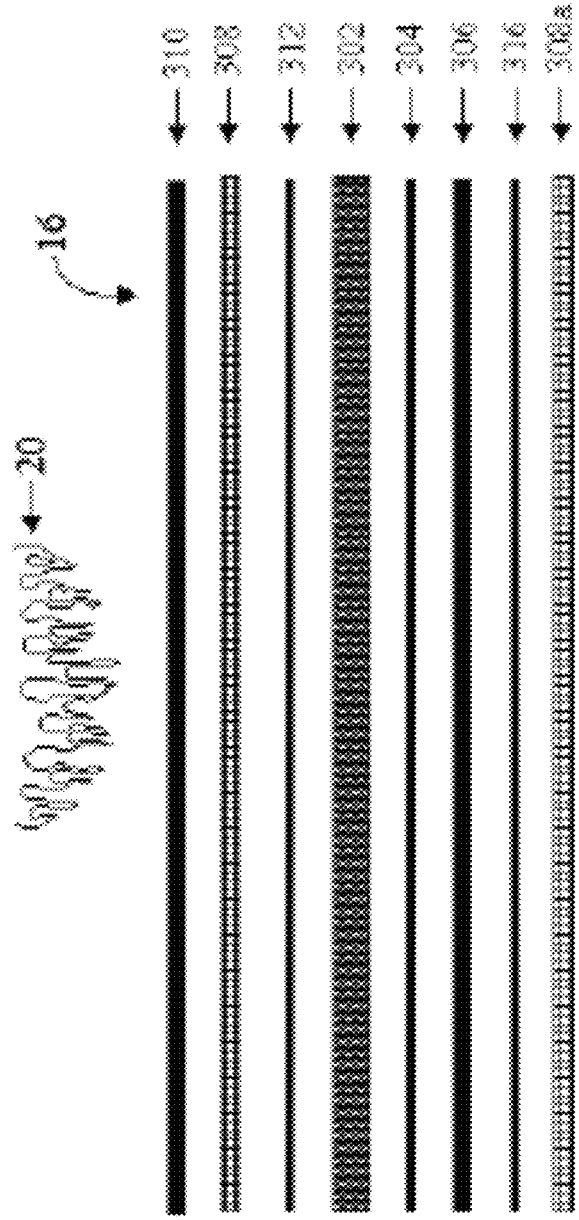

FIRE BARRIER LAYER AND FIRE BARRIER FILM LAMINATE

This application claims priority to Provisional U.S. Patent Application Ser. No. 61/616,323, filed Mar. 27, 2012, and is a continuation-in-part of U.S. patent application Ser. No. 13/299,399, filed Nov. 18, 2011.

TECHNICAL FIELD

A fire barrier laminate is provided for use in thermal and acoustical insulation systems, such as, but not limited to, those used in commercial aircraft.

BACKGROUND

The Federal Aviation Administration (FAA) has promulgated regulations, contained in 14 C.F.R. §§25.856(a) and (b), requiring thermal and acoustical insulation blanket systems in commercial aircraft to provide improved burn through protection and flame propagation resistance. These conventional thermal and acoustical insulation systems typically include thermal and acoustical insulation blankets encapsulated within a film covering or bag. As the thermal and acoustical insulation systems are conventionally constructed, the burn through regulations primarily affect the contents of the insulation systems' bags and the flame propagation resistance regulations primarily affect the film coverings used to fabricate the bags. Conventional film coverings typically are used as a layer or covering, for example, laid over or laid behind layers of thermal and acoustical insulation material, or as a covering or bag for partially or totally encapsulating one or more layers of thermal and acoustical insulation material.

The materials utilized in existing fire barrier materials may have poor thermal conductivity, may absorb moisture, and may tend to be fragile during handling or in use where harsh mechanical environments are encountered.

In certain embodiments, a fire barrier layer comprising an inorganic pigment that can be incorporated into a subject fire barrier laminate used for protecting thermal and acoustical insulation structures is provided. In certain embodiments, the present fire barrier laminate has improved mechanical stability, increased thermal conductivity and decreased water absorption.

SUMMARY

In one embodiment, the present fire barrier laminate includes a fire barrier layer which is incorporated into the fire barrier laminate for use in thermal and acoustical insulation systems, such as, but not limited to, those used in commercial aircraft. By way of example, but not limitation, the fire barrier laminate may be used as a covering that is located between insulation material in fuselage wall cavities and the outer skin of an aircraft fuselage (as an outboard cover of an insulation system) and/or between insulation material in fuselage wall cavities and the interior aircraft trim panels (as an inboard cover of an insulation system).

In certain embodiments, the subject fire barrier film laminate comprises at least one non-fibrous fire barrier layer coated onto at least one film layer, optionally a water-repellant material incorporated into and/or applied to the fire barrier layer, optionally at least one scrim layer, at least one second film layer, and optionally at least one adhesive layer, the non-fibrous fire barrier layer comprising at least one inorganic platelet material, optionally at least one organic binder and/or inorganic binder, and optionally at least one functional filler.

In one embodiment, the subject fire barrier film comprises at least one non-fibrous fire barrier layer coated onto at least one film layer, a water-repellant material incorporated into and/or applied to the fire barrier layer, at least one scrim layer, at least one secondary film layer, and optionally at least one adhesive layer, the non-fibrous fire barrier layer comprising at least one inorganic platelet material, optionally at least one organic binder and/or inorganic binder. In one embodiment, the non-fibrous fire barrier layer comprises at least one inorganic pigment material. In one embodiment, the at least one inorganic pigment material is a metal oxide-coated inorganic platelet material. In one embodiment, the metal oxide-coated inorganic platelet material is metal oxide-coated mica platelets.

In one embodiment, the subject fire barrier film laminate comprises:
  a. a first film layer;
  b. a support layer on top of the first film layer;
  c. a non-fibrous fire barrier layer on top of the support layer; and
  d. optionally, a second film layer on top of the non-fibrous fire barrier layer.

In one embodiment, the support layer comprises a fibrous layer and an adhesive.

In one embodiment, the support layer comprises a fibrous layer.

In one embodiment, the first film layer is on top of a scrim. In an alternate embodiment, the scrim is on top of the first film layer.

In one embodiment, the non-fibrous fire barrier layer comprises at least one inorganic pigment material.

In one embodiment, the at least one inorganic pigment material is a metal oxide-coated inorganic platelet material. In one embodiment, the metal oxide-coated inorganic platelet material is metal oxide-coated mica platelets.

In one embodiment, there is an adhesive layer between the non-fibrous fire barrier layer and the second film layer.

BRIEF DESCRIPTION OF THE DRAWINGS

The accompanying drawings, which are incorporated herein and form part of the specification, illustrate various embodiments of the present fire barrier laminate and, together with the description, further serve to explain the principles of the fire barrier laminate and to enable a person of ordinary skill in the art to make and use the fire barrier laminate. In the drawings, like reference numbers indicate identical or functionally similar elements. A more complete appreciation of the fire barrier laminate and many of the attendant advantages thereof will be readily obtained as the same becomes better understood by reference to the following detailed description when considered in connection with the accompanying drawings, wherein:

FIG. 1D is an exploded cross-sectional view of a further illustrative embodiment of the subject fire barrier laminate circled portion B' of the embodiment of FIG. 1A.

DETAILED DESCRIPTION

Figure 1A:
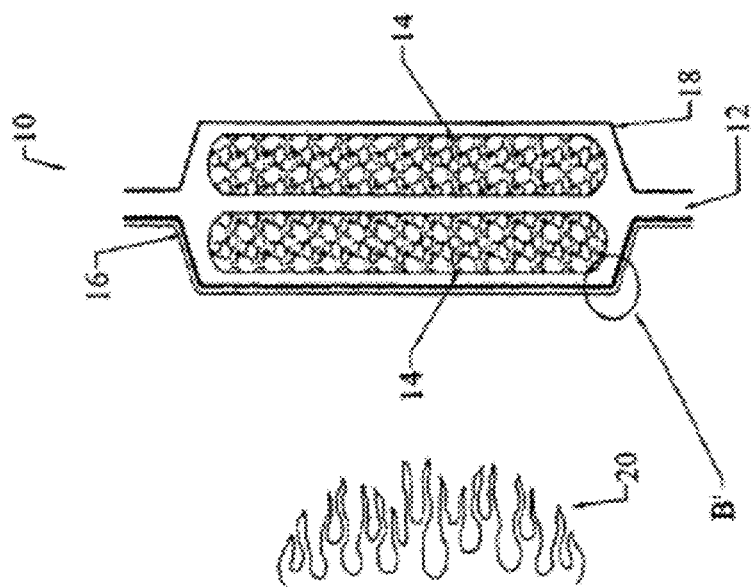
FIG. 1A is a schematic cross-sectional view of a thermal and acoustical aircraft insulation blanket protected by an embodiment of the subject fire barrier laminate.

For clarity of disclosure, and not by way of limitation, the detailed description is divided into the following subsections that describe or illustrate certain features, embodiments or applications of the present fire barrier laminate.

Non-Fibrous Fire Barrier Layer Comprising Inorganic Platelet Material

In certain embodiments, the subject fire barrier film laminate comprises at least one non-fibrous fire barrier layer coated onto at least one film layer, optionally a water-repellant material incorporated into and/or applied to the fire barrier layer, at least one scrim layer, at least one second film layer, and optionally at least one adhesive layer, the non-fibrous fire barrier layer comprising at least one inorganic platelet material, optionally at least one organic binder and/or inorganic binder, and optionally at least one functional filler.

Without wishing to be limited by theory, in fire barriers utilizing plain or uncoated mica based platelet materials, the individual platelets may be held together by Van der Waals forces. The Van der Waals forces may be reinforced by the addition of a resin or adhesive that provides covalent bonds between the platelets and the resin or adhesive.

In certain embodiments, the fire barrier laminate comprises: at least one non-fibrous fire barrier layer directly or indirectly coated onto at least one first polymeric flame propagation resistant film layer; at least one second film layer proximate to the non-fibrous fire barrier layer opposite the first polymeric flame propagation resistant film layer; at least one scrim layer disposed: (i) between the non-fibrous fire barrier layer and the first polymeric flame propagation resistant film layer; and/or (ii) between the non-fibrous fire barrier layer and the second film layer; and/or (iii) proximate to the first polymeric flame propagation resistant film layer opposite the non-fibrous fire barrier layer; and/or (iv) proximate to the second film layer opposite the non-fibrous fire barrier layer; optionally, a water-repellant material incorporated into and/or applied to the non-fibrous fire barrier layer; optionally at least one adhesive layer adhering the non-fibrous fire barrier layer to the first polymeric flame propagation resistant film layer; and optionally at least one adhesive layer adhering the scrim layer to at least one of the non-fibrous fire barrier layer, the first polymeric flame propagation resistant film layer, or the second film layer; wherein the non-fibrous fire barrier layer comprises at least one inorganic platelet material, optionally at least one organic binder and/or inorganic binder, and optionally at least one functional filler. Optionally, the second film layer may also be flame propagation resistant.

By indirectly coating, it is meant that the non-fibrous fire barrier layer may be coated onto an intermediate layer, such as a scrim, wherein the intermediate layer is engaged with the first polymeric flame propagation resistant film layer. The intermediate layer may be engaged with the first polymeric flame propagation resistant film layer before or after being coated with the non-fibrous fire barrier layer.

This composition provides a light basis weight article with surprising resistance to damage associated with handling and use along with the ability to resist flame propagation and flame penetration as defined in 14 C.F.R. §§25.856 (a) and (b). The term "basis weight" is defined as the weight per unit area, typically defined in grams per square meter (gsm). The subject fire barrier layer, and the laminate incorporating it, are therefore useful in providing fire burn-through protection for thermal and acoustical insulation structures, referred to in the industry as "blankets", for commercial aircraft fuselages, as the subject fire barrier laminate may have a basis weight of between about 80 gsm to about 120 gsm, and in certain embodiments between about 90 gsm to about 110 gsm.

The inorganic platelet material of the fire barrier layer may comprise at least one of vermiculite, mica, clay or talc. While any size inorganic platelet material may be used, inorganic platelet materials with larger relative diameters and high diameter to thickness aspect ratios may be desirable due to their increased flame propagation and/or burn-through resistance performance, as well as other properties such as flexibility and processibility. In certain embodiments, the inorganic platelet material may have a diameter of from about 20 μm to about 300 μm. In further embodiments, the inorganic platelet material may have a diameter of from about 40 μm to about 200 μm. In certain embodiments, the inorganic platelet material may have an aspect ratio of from about 50:1 to about 2000:1. In certain embodiments, the inorganic platelet material may have an aspect ratio of from about 50:1 to about 1000:1. In further embodiments, the inorganic platelet material may have an aspect ratio of from about 200:1 to about 800:1.

The vermiculite may be exfoliated, and may further be defoliated. By exfoliation, it is meant that the vermiculite is chemically or thermally expanded. By defoliated, it is meant that the exfoliated vermiculite is processed in order to reduce the vermiculite to substantially a platelet form. Vermiculite may be included in the fire barrier layer in an amount from about 20 to about 100 weight percent, based on the total weight of the fire barrier layer.

Suitable micas may include, without limitation, muscovite, phlogopite, biotite, lepidolite, glauconite, paragonite and zinnwaldite, and may include synthetic micas such as fluorophlogopite. Mica may be included in the fire barrier layer in an amount from about 20 to about 100 weight percent, based on the total weight of the fire barrier layer.

Suitable platelet clay materials that may be included in the fire barrier layer include, without limitation, ball clay, bentonite, smectite, hectorite, kaolinite, montmorillonite, saponite, sepiolite, sauconite, or combinations thereof. Platelet clay materials may be included in the fire barrier layer in an amount from about 5 to about 60 weight percent, in certain embodiments from about 5 to about 50 weight percent, based on the total weight of the fire barrier layer.

The mica, vermiculite and/or clay platelet materials may also be combined with further platelet materials, such as talc. If present, talc may be included in the fire barrier layer in an amount from about 1 to about 50 weight percent, in certain embodiments, from about 10 to about 30 weight percent, based on the total weight of the fire barrier layer.

The fire barrier layer may include inorganic binders. Without limitation, suitable inorganic binders include colloidal dispersions of alumina, silica, zirconia, and mixtures thereof. The inorganic binders, if present, may be used in amounts ranging from 0 to about 40 percent by weight, in some embodiments from 0 to about 20 weight percent, based upon the total weight of the fire barrier layer.

The fire barrier layer may further include one or more organic binders. The organic binder(s) may be provided as a solid, a liquid, a solution, a dispersion, a latex, or similar form. Examples of suitable organic binders include, but are not limited to, acrylic latex, (meth)acrylic latex, phenolic resins, copolymers of styrene and butadiene, vinylpyridine, acrylonitrile, copolymers of acrylonitrile and styrene, vinyl chloride, polyurethane, copolymers of vinyl acetate and ethylene, polyamides, silicones, unsaturated polyesters, epoxy resins, polyvinyl esters (such as polyvinylacetate or polyvinylbutyrate latexes) and the like.

The organic binder, if present, may be included in the fire barrier layer in an amount of from 0 to about 40 weight percent, in some embodiments from 0 to about 20 weight percent, based upon the total weight of the fire barrier layer.

Solvents for the binders, if needed, can include water or a suitable organic solvent, such as acetone, for the binder utilized. Solution strength of the binder in the solvent (if used) can be determined by conventional methods based on the binder loading desired and the workability of the binder system (viscosity, solids content, etc.).

In certain embodiments, the fire barrier layer may comprise from about 20% to about 100% by weight of the inorganic platelet material, from 0% to about 40% by weight of the organic binder and/or inorganic binder, and from 0% to about 50% of the functional filler.

In further embodiments, the fire barrier layer may comprise from about 60% to about 100% by weight of the inorganic platelet material, from 0% to about 20% by weight of the organic binder and/or inorganic binder, and from 0% to about 20% of the functional filler.

The fire barrier film laminate and/or the fire barrier layer may additionally comprise a water repellant additive or coating. The water repellant additive or coating may be a component of the fire barrier layer or may be a distinct coating or layer within the fire barrier film laminate, or may be saturated or impregnated into the fire barrier layer. The water repellant additive may alternatively or additionally be present in the adhesives, which may be utilized in the subject fire barrier laminate. Without limitation, the water repellant additive or coating may comprise a water repellant silicone; a metal chloride salt such as calcium chloride, magnesium chloride, sodium chloride, potassium chloride, or aluminum chloride; silane; fluorinated compounds or fluorosurfactants such as polytetrafluoroethylene resin; polymeric wet strength resins such as polyamide resin or polyamide-epichlorohydrin resin; mixtures thereof, and the like.

The functional filler(s) may include, but not be limited to, non-platelet clays (such as attapulgite, kyanite, palygorskite, silimanite, or andalucite), fumed silica, boron nitride, cordierite and the like. According to certain embodiments, the functional fillers may include finely divided metal oxides, which may comprise at least one of pyrogenic silicas, arc silicas, low-alkali precipitated silicas, fumed silica, silicon dioxide aerogels, aluminum oxides, titania, calcia, magnesia, potassia, and mixtures thereof.

In certain embodiments, the functional filler may comprise endothermic fillers such as alumina trihydrate, magnesium carbonate, and other hydrated inorganic materials including cements, hydrated zinc borate, calcium sulfate (gypsum), magnesium ammonium phosphate, magnesium hydroxide and combinations thereof. In further embodiments, the functional filler(s) may include lithium-containing minerals. In still further embodiments, the functional fillers(s) may include fluxing agents and/or fusing agents.

In certain embodiments, the functional filler may comprise fire retardant fillers such as antimony compounds, magnesium hydroxide, hydrated alumina compounds, borates, carbonates, bicarbonates, inorganic halides, phosphates, sulfates, organic halogens or organic phosphates.

The fire barrier layer may be directly or indirectly coated onto a film, for example, without limitation, by roll or reverse roll coating, gravure or reverse gravure coating, transfer coating, spray coating, brush coating, dip coating, tape casting, doctor blading, slot-die coating, or deposition coating. In certain embodiments, the fire barrier layer is coated onto the film as a slurry of the ingredients in a solvent, such as water, and is allowed to dry prior to incorporation into the fire barrier laminate. The fire barrier layer may be created as a single layer or coating, thus utilizing a single pass, or may be created by utilizing multiple passes, layers or coatings. By utilizing multiple passes, the potential for formation of defects in the fire barrier layer is reduced. If multiple passes are desired, the second and possible subsequent passes may be formed onto the first pass while the first pass is still substantially wet, i.e. prior to drying, such that the first and subsequent passes are able to form a single unitary fire barrier layer upon drying.

When multiple passes, layers or coating of the fire barrier layer are utilized, it is possible to vary the amounts of the ingredients in each pass, layer or coating, such that the passes, layers or coatings may have different amounts of, for example, inorganic platelet material. In certain embodiments, at least one pass, layer or coating having a greater amount of inorganic platelet material may be present on the "hot face" of the fire barrier layer. Further, in certain embodiments another pass, layer or coating may have a greater amount of functional filler in order to reduce the amount of defects present in the pass, layer or coating, and may have a greater ability to correct defects present in a previous pass, layer or coating.

In certain embodiments, the fire barrier layer may be directly or indirectly coated onto a first polymeric flame propagation resistant film, such as but not limited to polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, ethylene chlorotrifluoroethylene, combinations thereof, and the like. Commercially available examples of these films are films sold by E.I. DuPont de Nemours & Co. of Wilmington, Del., such as a polyester film sold under the trade designation MYLAR®, a polyvinylfluoride film sold under the trade designation TEDLAR®, and a polyimide film sold under the trade designation KAPTON®, a polyetheretherketone film sold under the trade designation APTIV® by Victrex, plc. of Lancashire, UK, a polyetheretherketone film sold under the trade designation KETASPIRE® and an ethylene chlorotrifluoroethylene film sold under the trade designation HALAR® by Solvay SA of Brussels, Belgium, and the like. The first polymeric flame propagation resistant film may be metalized to minimize moisture absorption, particularly on the outboard side, but optionally on the inboard side also.

In certain embodiments, the first polymeric flame propagation resistant film and/or the metalized first polymeric flame propagation resistant film may have an opaque, low-gloss polymer coating, optionally containing a fire retardant additive. The fire retardant additives may comprise at least one of antimony compounds, hydrated alumina compounds, borates, carbonates, bicarbonates, inorganic halides, phosphates, sulfates, organic halogens or organic phosphates.

The fire barrier laminate may additionally include an adhesive on one of the outer surfaces to facilitate thermal or other energetic bonding of the laminate to companion backside films as currently practiced in the fabrication of thermal acoustic insulation blankets to form a covering, bag, or envelope for the insulation layers. In some embodiments, a partially or substantially totally encapsulated insulation system is formed. (Air holes may be employed to accommodate pressure variation during flight.) In certain embodiments, the adhesive comprises an adhesive which is activated by the application of ultrasonic or radio frequency energy, or the like.

Optionally, at least one scrim layer may be disposed within the adhesive or a surface adjacent to an adhesive on at least one side of, or within, the fire barrier laminate, in order to, for example, add strength to the laminate, including puncture or tear resistance. In certain embodiments, a scrim may be disposed between the at least one non-fibrous fire barrier layer and the first polymeric flame propagation resistant film layer, such that the non-fibrous fire barrier layer may be coated indirectly onto the flame propagation resistant film layer by coating the non-fibrous fire barrier layer onto the scrim. The scrim may be in the form of a mesh, and may comprise fiberglass, nylon, polyester (such as aromatic polyester), aramid (such as para-aramid), or high or ultra-high molecular weight polyethylene in various embodiments, or may be absent.

The fire barrier laminate may additionally include adhesives, internal to the fire barrier laminate, which are utilized to laminate or otherwise adhere the layers of the fire barrier laminate to one another. These adhesives may include thermally activated or pressure-based adhesives. The adhesives may comprise at least one of polyester based adhesives or polyvinyl fluoride based adhesives, and/or silicone adhesives. In certain embodiments, the adhesives may contain fire retardant additives. The fire retardant additives may comprise at least one of antimony compounds, hydrated alumina compounds, borates, carbonates, bicarbonates, inorganic halides, phosphates, sulfates, organic halogens or organic phosphates.

As shown in FIG. 1A, an embodiment of a thermal acoustic insulation system 10, or "blanket", is depicted in cross-section, in which two insulating layers 14, such as one inch thick MICROLITE AA® Premium NR fiberglass insulation (0.42 pcf) (available from Johns Manville International, Inc.), are disposed within a covering of an exteriorly facing fire barrier laminate 16, and an interiorly facing inboard cover film 18 (optionally, a second fire barrier laminate). The insulating layers 14 may also or alternatively comprise polyimide foam insulation. The exteriorly facing laminate 16 and the inboard film 18 may be heat sealed with an adhesive 12 to partially or substantially totally envelop or encapsulate the fiberglass insulation layers. Flames 20, depicting the FAA test procedures, are shown proximate to the exteriorly facing fire barrier laminate 16.

Figure 1B:
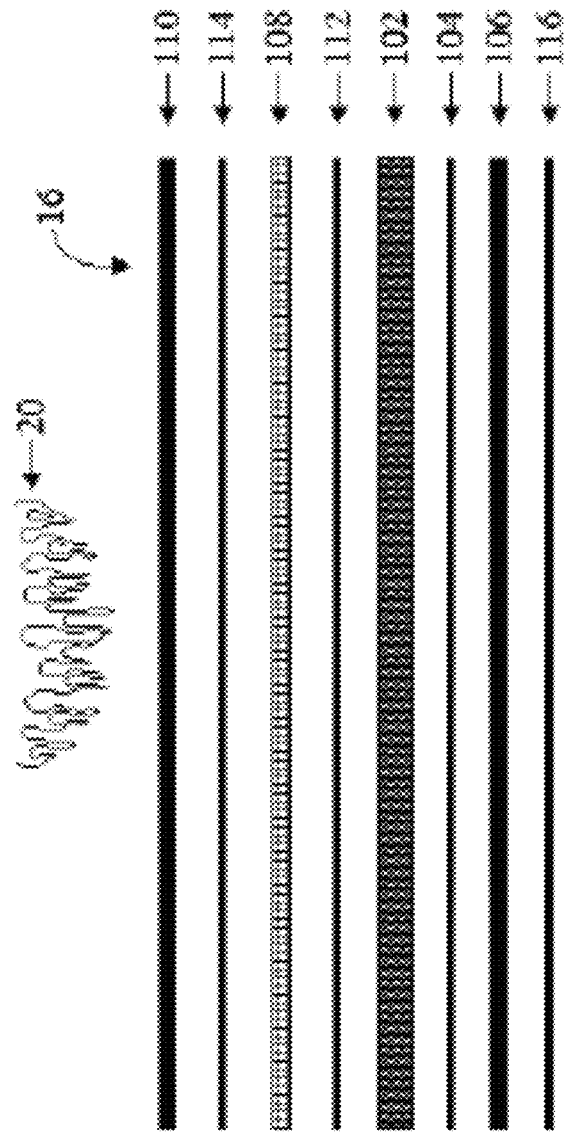
FIG. 1B is an exploded cross-sectional view of the subject fire barrier laminate circled portion B' of the embodiment of FIG. 1A.

A detailed section of an embodiment of the fire barrier laminate 16, encircled as B' in FIG. 1A is shown in an exploded cross-sectional view in FIG. 1B. The fire barrier laminate 16 is constructed by first applying an adhesive 104 to a first polymeric flame propagation resistant film 106, such as a polyetheretherketone film. The fire barrier layer 102 is then coated onto the adhesive 104-coated first polymeric film 106. Alternatively, the adhesive 104 may be omitted, resulting in the fire barrier layer 102 being coated directly onto the first polymeric film 106. The fire barrier layer 102 may comprise a paste or slurry type material with an amount of water or other solvent being present in the fire barrier layer 102 as it is being coated onto the first polymeric film 106. In this instance, the fire barrier layer 102 is allowed to dry before continued processing. Optionally, a water-repellant material may be incorporated in, coated onto or saturated/impregnated into the fire barrier layer 102.

Separately, a scrim layer 108, such as a fiberglass or nylon scrim, is laminated to a second film 110, such as a polyetheretherketone film, using an adhesive 114. An adhesive 112 is also used to laminate the fire barrier layer 102-coated first polymeric film 106 to the scrim layer 108. Alternatively, the scrim layer 108 may be adhered to the fire barrier layer 102 prior to laminating the scrim layer 108 to the second film 110.

Optionally, the assembled fire barrier laminate 16 includes an encapsulating adhesive layer 116 adjacent to the first polymeric film 106 in order to encapsulate the insulation layers 14 between the fire barrier laminate 16 and the inboard film 18. Additionally or alternatively, the fire barrier laminate 16 may utilize mechanical fasteners or tapes for encapsulating the insulation layers 14 between the fire barrier laminate 16 and the inboard film 18.

Figure 1C:
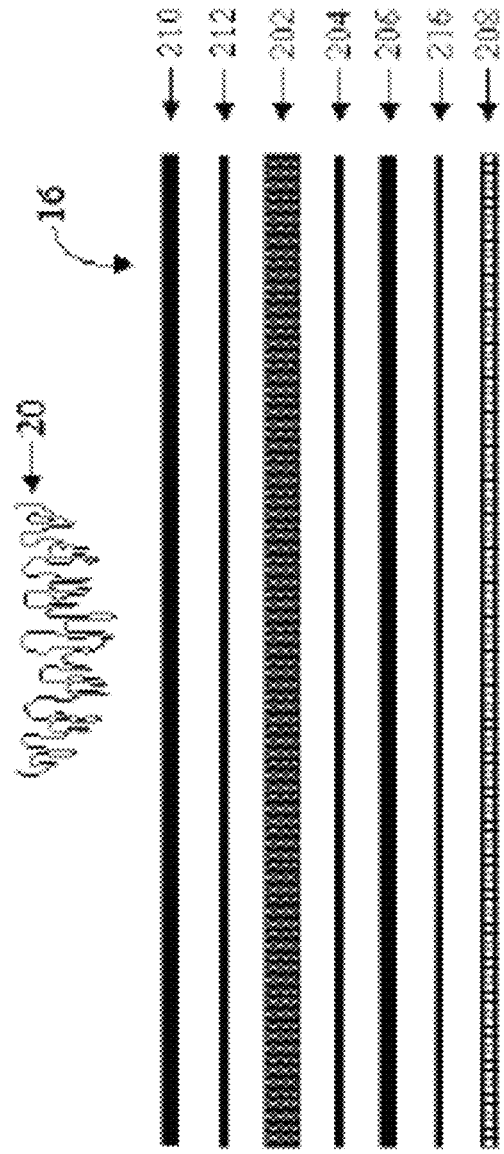
FIG. 1C is an exploded cross-sectional view of another illustrative embodiment of the subject fire barrier laminate circled portion B' of the embodiment of FIG. 1A.

A detailed section of another embodiment of the fire barrier laminate 16, encircled as B' in FIG. 1A is shown in an exploded cross-sectional view in FIG. 1C. The fire barrier laminate 16 is constructed by first applying an adhesive 204 to a first polymeric flame propagation resistant film 206, such as an ethylene chlorotrifluoroethylene film. The fire barrier layer 202 is then coated onto the adhesive 204-coated first polymeric film 206. Alternatively, the adhesive 204 may be omitted, resulting in the fire barrier layer 202 being coated directly onto the first polymeric film 206. The fire barrier layer 202 may comprise a paste or slurry type material with an amount of water or other solvent being present in the fire barrier layer 202 as it is being coated onto the first polymeric film 206. In this instance, the fire barrier layer 202 is allowed to dry before continued processing. Optionally, a water-repellant material may be incorporated in, coated onto or saturated/impregnated into the fire barrier layer 202.

A second film 210, such as a metalized polyetheretherketone film, is laminated to the fire barrier layer 202-coated first polymeric film 206 using an adhesive 212. The fire barrier laminate 16 includes a scrim layer 208 laminated to the first polymeric film 206 opposite the fire barrier layer 202 via an adhesive layer 216.

A detailed section of a further embodiment of the fire barrier laminate 16, encircled as B' in FIG. 1A is shown in an exploded cross-sectional view in FIG. 1D. The fire barrier laminate 16 is constructed by first applying an adhesive 304 to a first polymeric flame propagation resistant film 306, such as a metalized polyetheretherketone film. The fire barrier layer 302 is then coated onto the adhesive 304-coated first polymeric film 306. Alternatively, the adhesive 304 may be omitted, resulting in the fire barrier layer 302 being coated directly onto the first polymeric film 306. The fire barrier layer 302 may comprise a paste or slurry type material with an amount of water or other solvent being present in the fire barrier layer 302 as it is being coated onto the first polymeric film 306. In this instance, the fire barrier layer 302 is allowed to dry before continued processing. Optionally, a water repellant material may be incorporated in, coated onto or saturated/impregnated into the fire barrier layer 302.

Separately, a scrim layer 308, such as a fiberglass or nylon scrim, is laminated to a second film 310, such as a polyetheretherketone film. An adhesive 312 is also used to laminate the fire barrier layer 302-coated first polymeric film 306 to the scrim layer 308. Alternatively, the scrim layer 308 may be adhered to the fire barrier layer 302 prior to laminating the scrim layer 308 to the second film 310.

The assembled fire barrier laminate 16 may include an encapsulating adhesive layer 316 adjacent to the first polymeric film 306 in order to encapsulate the insulation layers 14 between the fire barrier laminate 16 and the inboard film 18. A second scrim layer 308a is optionally embedded in the adhesive layer 316.

Figure 1E:
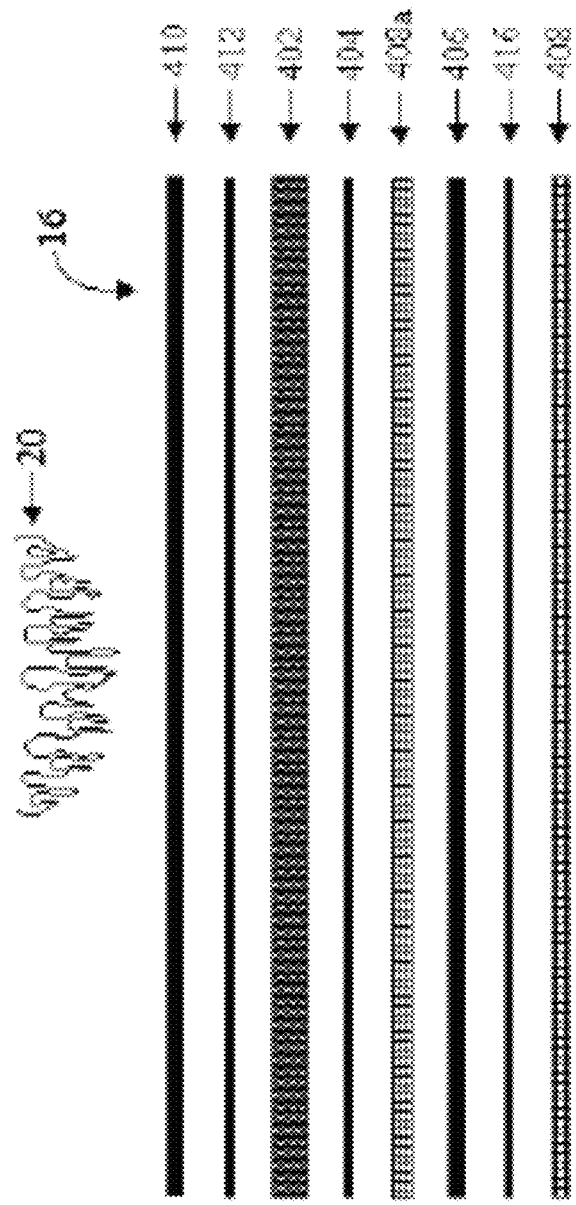
FIG. 1E is an exploded cross-sectional view of a further illustrative embodiment of the subject fire barrier laminate circled portion B' of the embodiment of FIG. 1A.

A detailed section of a further embodiment of the fire barrier laminate 16, encircled as B' in FIG. 1A is shown in an exploded cross-sectional view in FIG. 1E. The fire barrier laminate 16 is constructed by first applying an adhesive 404 to a first polymeric flame propagation resistant film 406, such as a polyetheretherketone film. A second scrim layer 408a is optionally laminated between the adhesive 404 and the first polymeric film 406. The fire barrier layer 402 is then coated onto the adhesive 404-coated first polymeric film 406. Alternatively, the adhesive 404 may be omitted, resulting in the fire barrier layer 402 being coated directly onto the first polymeric film 406. The fire barrier layer 402 may comprise a paste or slurry type material with an amount of water or other solvent being present in the fire barrier layer 402 as it is being coated onto the first polymeric film 406. In this instance, the fire barrier layer 402 is allowed to dry before continued processing. Optionally, a water repellant material may be incorporated in, coated onto or saturated/impregnated into the fire barrier layer 402.

A second film 410, such as a metalized polyetheretherketone film, is laminated to the fire barrier layer 402-coated first polymeric film 406 using an adhesive 412. The fire barrier laminate 16 includes a scrim layer 408 laminated to the first polymeric film 406 opposite the fire barrier layer 402 via an adhesive layer 416.

In a first embodiment, a subject fire barrier laminate may comprise: at least one non-fibrous fire barrier layer directly or indirectly coated onto at least one first polymeric flame propagation resistant film layer; at least one second film layer proximate to the non-fibrous fire barrier layer opposite the first polymeric flame propagation resistant film layer; at least one scrim layer disposed: (i) between the non-fibrous fire barrier layer and the first polymeric flame propagation resistant film layer; and/or (ii) between the non-fibrous fire barrier layer and the second film layer; and/or (iii) proximate to the first polymeric flame propagation resistant film layer opposite the non-fibrous fire barrier layer; and/or (iv) proximate to the second film layer opposite the non-fibrous fire barrier layer; optionally, a water-repellant material incorporated into and/or applied to the non-fibrous fire barrier layer; optionally at least one adhesive layer adhering the non-fibrous fire barrier layer to the first polymeric flame propagation resistant film layer; and optionally at least one adhesive layer adhering the scrim layer to at least one of the non-fibrous fire barrier layer, the first polymeric flame propagation resistant film layer, or the second film layer; wherein the non-fibrous fire barrier layer comprises at least one inorganic platelet material, optionally at least one organic binder and/or inorganic binder, and optionally at least one functional filler.

The fire barrier laminate of the first embodiment may further include that the inorganic platelet material comprises at least one of vermiculite, mica, clay or talc. The vermiculite may be exfoliated and optionally defoliated. The clay may comprise at least one of ball clay, bentonite, smectite, hectorite, kaolinite, montmorillonite, saponite, sepiolite or sauconite.

The fire barrier laminate of either or both of the first or subsequent embodiments may further include that the organic binder comprises at least one of acrylic latex, (meth)acrylic latex, phenolic resins, copolymers of styrene and butadiene, vinylpyridine, acrylonitrile, copolymers of acrylonitrile and styrene, vinyl chloride, polyurethane, copolymers of vinyl acetate and ethylene, polyamides, silicones, unsaturated polyesters, epoxy resins or polyvinyl esters.

The fire barrier laminate of any of the first or subsequent embodiments may further include that the inorganic binder comprises at least one of colloidal alumina, colloidal silica or colloidal zirconia.

The fire barrier laminate of any of the first or subsequent embodiments may further include that the non-fibrous fire barrier layer comprises from about 20% to about 100% by weight of the inorganic platelet material, from 0% to about 40% by weight of the organic binder and/or inorganic binder, and from 0% to about 50% of the functional filler.

The fire barrier laminate of any of the first or subsequent embodiments may further include that the non-fibrous fire barrier layer comprises from about 60% to about 100% by weight of the inorganic platelet material, from 0% to about 20% by weight of the organic binder and/or inorganic binder, and from 0% to about 20% of the functional filler.

The fire barrier laminate of any of the first or subsequent embodiments may further include that either or both of the first polymeric flame propagation resistant film layer or the second film layer comprises at least one of polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, ethylene chlorotrifluoroethylene, or combinations thereof.

The fire barrier laminate of any of the first or subsequent embodiments may further include that the at least one scrim layer comprises at least one of fiberglass, nylon, polyester, aramid, or high or ultra-high molecular weight polyethylene.

The fire barrier laminate of any of the first or subsequent embodiments may further include that either or both of the first polymeric flame propagation resistant film layer and the second film layer are metalized. Either or both of the first polymeric flame propagation resistant film layer or the second film layer have an opaque, low-gloss polymer coating, optionally including a fire retardant additive.

The fire barrier laminate of any of the first or subsequent embodiments may have a basis weight of less than about 120 gsm.

In a second embodiment, a subject thermal acoustic insulation system may comprise a plurality of insulating layers disposed within a covering of an exteriorly facing fire barrier laminate as in any of the first or subsequent embodiments, and an interiorly facing inboard cover film.

The thermal acoustic insulation system of the second embodiment may further include that the interiorly facing cover film also comprises the fire barrier laminate.

The thermal acoustic insulation system of either or both of the second or subsequent embodiments may further include that the exteriorly facing fire barrier laminate and the interiorly facing inboard cover film are sealed with an adhesive to partially or substantially totally envelop or encapsulate the plurality of insulating layers.

The thermal acoustic insulation system of any of the second or subsequent embodiments may further include that the insulating layers comprise fiberglass insulation and/or polyimide foam insulation.

The thermal acoustic insulation system of any of the second or subsequent embodiments may be capable of passing the flame propagation and burn-through resistance test protocols of 14 C.F.R. §§25.856(a) and (b), Appendix F, Parts VI and VII.

In a third embodiment, a subject method of making a fire barrier laminate may comprise: directly or indirectly coating at least one non-fibrous fire barrier layer onto a first polymeric flame propagation resistant film layer; laminating the non-fibrous fire barrier layer with at least one second film layer, wherein the second film layer is proximate to the non-fibrous fire barrier layer; and laminating at least one scrim layer within the fire barrier laminate, wherein the at least one scrim layer is disposed: (i) between the non-fibrous fire barrier layer and the first polymeric flame propagation resistant film layer; and/or (ii) between the non-fibrous fire barrier layer and the second film layer; and/or (iii) proximate to the first polymeric flame propagation resistant film layer opposite the non-fibrous fire barrier layer; and/or (iv) proximate to the second film layer opposite the non-fibrous fire barrier layer; wherein the non-fibrous fire barrier layer comprises at least one inorganic platelet material, optionally at least one organic binder and/or inorganic binder, and optionally at least one functional filler; and wherein the non-fibrous fire barrier layer optionally contains a water repellant material, and/or the method further comprises optionally coating and/or saturating the non-fibrous fire barrier layer with a water repellant material.

The method of the third embodiment may further include that the inorganic platelet material comprises at least one of vermiculite, mica, clay or talc. The vermiculite may be exfoliated and optionally defoliated.

The method of either or both of the third or subsequent embodiments may further include that the organic binder comprises at least one of acrylic latex, (meth)acrylic latex, phenolic resins, copolymers of styrene and butadiene, vinylpyridine, acrylonitrile, copolymers of acrylonitrile and styrene, vinyl chloride, polyurethane, copolymers of vinyl acetate and ethylene, polyamides, silicones, unsaturated polyesters, epoxy resins or polyvinyl esters.

The method of any of the third or subsequent embodiments may further include that the inorganic binder comprises at least one of colloidal alumina, colloidal silica or colloidal zirconia.

The method of any of the third or subsequent embodiments may further include that the non-fibrous fire barrier layer comprises from about 20% to about 100% by weight of the inorganic platelet material, from 0% to about 40% by weight of the organic binder and/or inorganic binder, and from 0% to about 50% of the functional filler.

The method of any of the third or subsequent embodiments may further include that either or both of the first polymeric flame propagation resistant film layer or the second film layer comprises at least one of polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, ethylene chlorotrifluoroethylene, or combinations thereof.

The method of any of the third or subsequent embodiments may further include that the at least one scrim layer comprises at least one of fiberglass, nylon, polyester, aramid, or high or ultra-high molecular weight polyethylene.

The method of any of the third or subsequent embodiments may further include that either or both of the first polymeric flame propagation resistant film layer or the second film layer are metalized. Either or both of the first polymeric flame propagation resistant film layer or the second film layer may be coated with an opaque, low-gloss polymer, optionally including a fire retardant additive.

Non-Fibrous Fire Barrier Layer Comprising Inorganic Pigment Material

In one embodiment, the present fire barrier layer provided is a non-fibrous fire-barrier layer that is incorporated into a fire barrier laminate, wherein the fire barrier layer comprises a film of at least one inorganic pigment material. The at least one inorganic pigment material may provide superior thermal conductivity and/or heat reflective properties, thus spreading the incident thermal energy along the entire surface of the fire-barrier, the preventing the formation of hot spots.

In one embodiment, the subject fire barrier laminate comprises:
a. a first film layer;
b. a support layer;
c. at least one non-fibrous fire barrier layer; and
d. optionally, a second film layer.

In one embodiment, the second film layer is applied to the non-fibrous fire barrier layer using an adhesive.

In one embodiment, the non-fibrous fire barrier layer comprises at least one inorganic pigment material. In one embodiment, the at least one inorganic pigment material is a metal oxide-coated inorganic platelet material. In one embodiment, the metal oxide-coated inorganic platelet material is metal oxide-coated mica platelets.

In an alternate embodiment, the subject fire barrier film laminate lacks the second film layer.

In one embodiment, the support layer comprises a fibrous layer and an adhesive.

In one embodiment, the support layer is a fibrous layer.

In one embodiment, a scrim layer is laminated to the first film layer on the opposite surface to the support layer using an adhesive. In an alternate embodiment, the scrim layer is laminated to the first film layer on the same side as the support layer.

Construction of the Fire-Barrier Laminate

Figure 2:
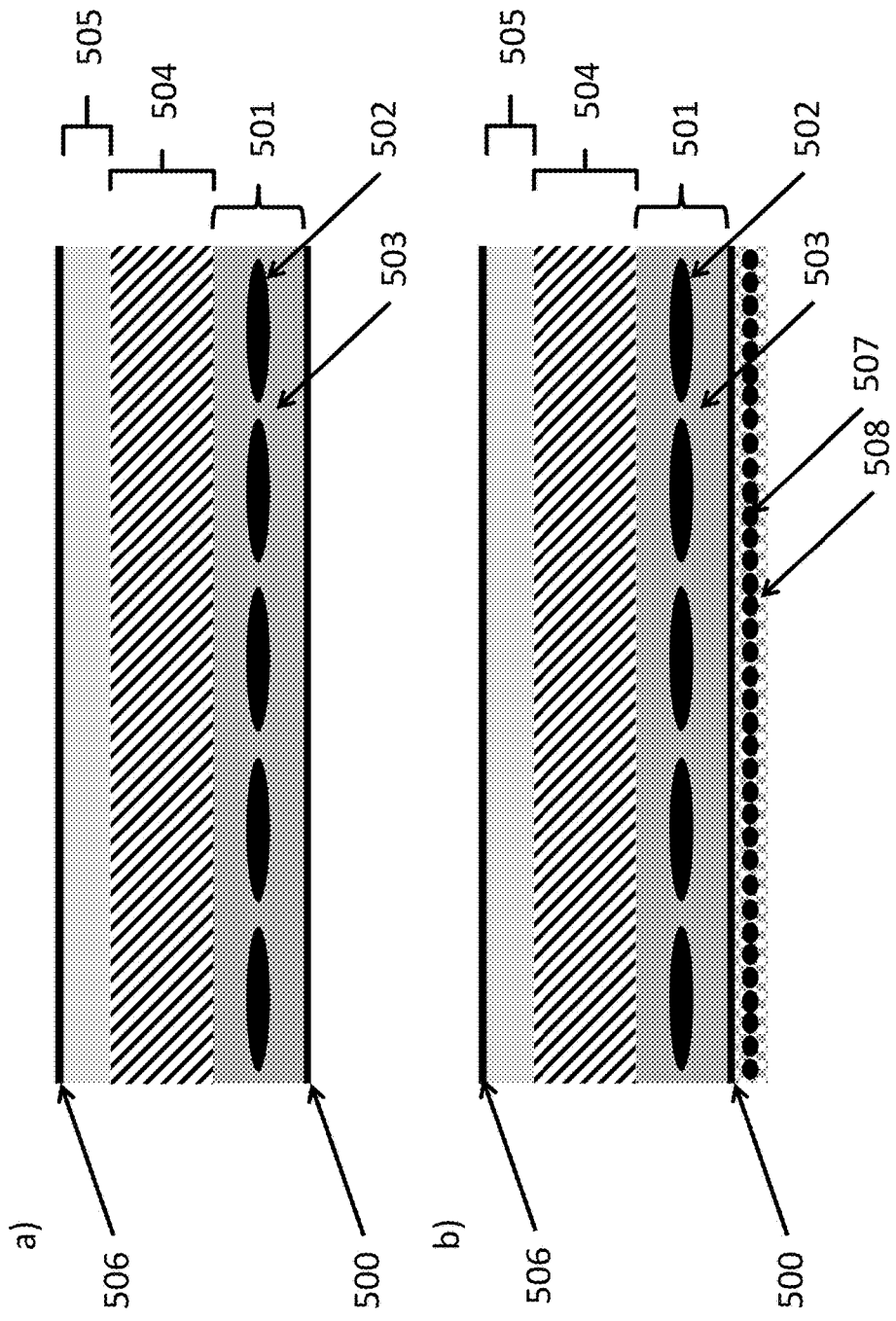
FIG. 2 depicts a further illustrative embodiment of the subject fire barrier laminate. Panel a) depicts a fire barrier laminate comprising a first film layer (500), with a support layer (501) coated onto the top surface of the first film layer (500). The support layer (501) comprises a fibrous layer (502) in a first adhesive layer (503). A non-fibrous fire barrier layer (504) is coated onto the support layer (501). A second adhesive layer (505) is coated onto the non-fibrous fire barrier layer (504), onto which a second film layer (506) is overlaid. Panel b) depicts a fire barrier laminate comprising a scrim (507) that is laminated to the bottom surface of the first film layer (500) using a heat seal adhesive (508). The first film layer (500) has a support layer (501) coated onto the top surface of the first film layer (500). The support layer (501) comprises a fibrous layer (502) in a first adhesive layer (503). A non-fibrous fire barrier layer (504) is coated onto the support layer (501). A second adhesive layer (505) is coated onto the non-fibrous fire barrier layer (504), onto which a second film layer (506) is overlaid.

Referring to FIG. 2, in one embodiment, the present fire barrier laminate may comprise a first film layer (500), with a support layer (501) coated onto the top surface of the first film layer (500). The support layer (501) comprises a fibrous layer (502) in a first adhesive layer (503). A non-fibrous fire barrier layer (504) is coated onto the support layer (501). A second adhesive layer (505) is coated onto the non-fibrous fire barrier layer (504), onto which a second film layer (506) is overlaid. In one embodiment, the second adhesive layer (505) and the second film layer (506) are absent.

Referring to FIG. 2, in an alternate embodiment, the present fire barrier laminate may comprise a scrim (507) that is laminated to the bottom surface of the first film layer (500) using an adhesive (508). The first film layer (500) has a support layer (501) coated onto the top surface of the first film layer (500). The support layer (501) comprises a fibrous layer (502) in a first adhesive layer (503). A non-fibrous fire barrier layer (504) is coated onto the support layer (501). A second adhesive layer (505) is coated onto the non-fibrous fire barrier layer (504), onto which a second film layer (506) is overlaid. In one embodiment, the second adhesive layer (505) and the second film layer (506) are absent.

In one embodiment, non-fibrous fire barrier layer (504) comprises at least one inorganic pigment material. In one embodiment, the at least one inorganic pigment material is a metal oxide-coated inorganic platelet material. In one embodiment, the metal oxide-coated inorganic platelet material is metal oxide-coated mica platelets.

In one embodiment, the adhesive (508) is an adhesive that requires the application of ultrasonic or radio frequency energy, or heat, or the like to activate it.

In one embodiment, the adhesive (508) is a heat seal adhesive.

In one embodiment, the scrim (507) that is laminated to the bottom surface of the first film layer (500) using an adhesive (508) is a prefabricated component, onto which the support layer (501), the non-fibrous fire barrier layer (504), second adhesive (505) and second film layer (506) is added. In one embodiment, the prefabricated component comprises a scrim and a high temperature thermoplastic film with a high strength:weight ratio. One of ordinary skill in the art can readily appreciate that any a high temperature thermoplastic film with a high strength:weight ratio is suitable for use in the present invention.

In one embodiment, the high temperature thermoplastic film is comprised of a material selected from the group consisting of: polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, ethylene chlorotrifluoroethylene, and combinations thereof.

In one embodiment, the high temperature thermoplastic film is metallized.

In one embodiment, the scrim (507) that is laminated to the bottom surface of the first film layer (500) using an adhesive (508) is provided prefabricated as a commercially available product, onto which the support layer (501), the non-fibrous fire barrier layer (504), second adhesive (505) and second film layer (506) is added. In one embodiment, the commercially available product is a laminate containing a scrim and a polyetheretherketone film, such as the laminate sold under the trade designation LAMAGUARD 131MD. In an alternate embodiment, the commercially available product is a laminate containing a scrim, and a polyetheretherketone film, such as the laminate sold under the trade designation LAMAGUARD 110.

This composition provides a light basis weight article with surprising resistance to damage associated with handling and use along with the ability to resist flame propagation and flame penetration as defined in 14 C.F.R. §§25.856(a) and (b). The term "basis weight" is defined as the weight per unit area, typically defined in grams per square meter (gsm). The subject fire barrier layer, and the laminate incorporating it, are therefore useful in providing fire burn-through protection for thermal and acoustical insulation structures, referred to in the industry as "blankets", for commercial aircraft fuselages, as the subject fire barrier laminate may have a basis weight less than about 110 gsm, in certain embodiments between about 50 gsm to about 110 gsm, and in certain embodiments between about 90 gsm to about 105 gsm.

Figure 3:
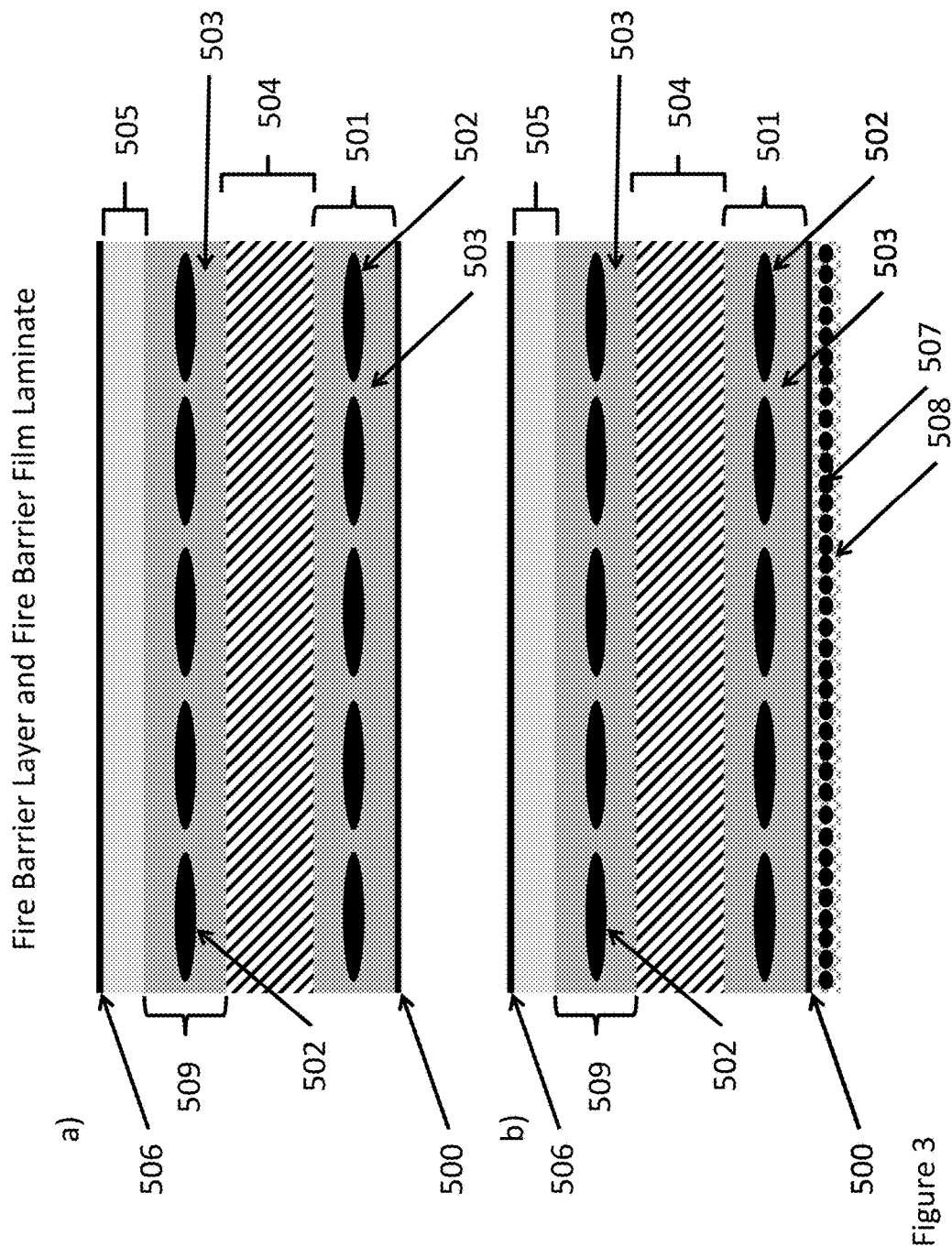
FIG. 3 depicts a further illustrative embodiment of the subject fire barrier laminate. Panel a) depicts a fire barrier laminate comprising a first film layer (500), with a support layer (501) coated onto the top surface of the first film layer (500). The support layer (501) comprises a fibrous layer (502) in a first adhesive (503). A non-fibrous fire barrier layer (504) is coated onto the support layer (501). A second support layer (509) is coated on to the non-fibrous fire barrier layer (504). The second support layer (509) comprises a glass fabric (502) and a first adhesive layer (503). A second adhesive layer (505) is coated onto the second support layer (509), onto which a second film layer (506) is overlaid. Panel b) depicts a fire barrier laminate comprising a scrim (507) that is laminated to the bottom surface of the first film layer (500) using a heat seal adhesive (508). The first film layer (500) has a support layer (501) coated onto the top surface of the first film layer (500). The support layer (501) comprises a fibrous layer (502) in a first adhesive layer (503). A non-fibrous fire barrier layer (504) is coated onto the support layer (501). A second support layer (509) is coated on to the non-fibrous fire barrier layer (504). The second support layer (509) comprises a glass fabric (502) and a first adhesive (503). A second adhesive layer (505) is coated onto the second support layer (509), onto which a second film layer (506) is overlaid.

Referring to FIG. 3, in one embodiment, the present fire barrier laminate may comprise a first film layer (500), with a support layer (501) coated onto the top surface of the first film layer (500). The support layer (501) comprises a fibrous layer (502) in a first adhesive (503). A non-fibrous fire barrier layer (504) is coated onto the support layer (501). A second support layer (509) is coated on to the non-fibrous fire barrier layer (504). The second support layer (509) comprises a fibrous layer (502) and a first adhesive layer (503). A second adhesive layer (505) is coated onto the second support layer (509), onto which a second film layer (506) is overlaid. In one embodiment, the second adhesive layer (505) and the second film layer (506) are absent.

Referring to FIG. 3, in an alternate embodiment, the present fire barrier laminate may comprise a scrim (507) that is laminated to the bottom surface of the first film layer (500) using an adhesive (508). The first film layer (500) has a support layer (501) coated onto the top surface of the first film layer (500). The support layer (501) comprises a fibrous layer (502) in a first adhesive layer (503). A non-fibrous fire barrier layer (504) is coated onto the support layer (501). A second support layer (509) is coated on to the non-fibrous fire barrier layer (504). The second support layer (509) comprises a fibrous layer (502) and a first adhesive (503). A second adhesive layer (505) is coated onto the second support layer (509), onto which a second film layer (506) is overlaid. In one embodiment, the second adhesive layer (505) and the second film layer (506) are absent.

Figure 4:
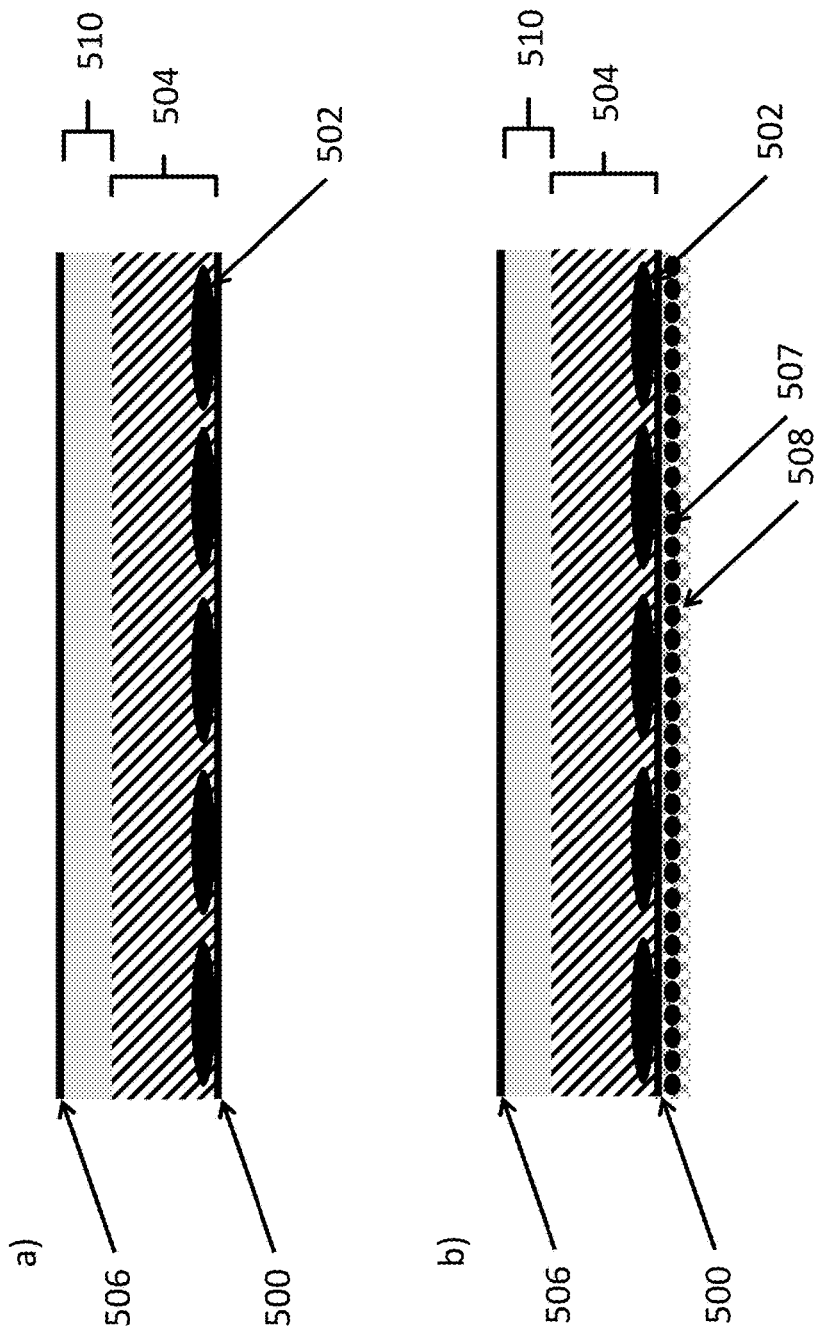
FIG. 4 depicts a further illustrative embodiment of the subject fire barrier laminate. Panel a) depicts a fire barrier laminate comprising a first film layer (500) onto which a fibrous layer (502) is overlaid. A non-fibrous fire barrier layer (504) is coated onto the fibrous layer (502). A third adhesive layer (510) is coated onto the non-fibrous fire barrier layer (504), onto which a second film layer (506) is overlaid. Panel b) depicts a fire barrier laminate comprising a scrim (507) that is laminated to the bottom surface of the first film layer (500) using a heat seal adhesive (508). A fibrous layer (502) is overlaid on to the top surface of the first film layer (500). A non-fibrous fire barrier layer (504) is coated onto the fibrous layer (502). A third adhesive layer (510) is coated onto the non-fibrous fire barrier layer (504), onto which a second film layer (506) is overlaid.

Referring to FIG. 4, in one embodiment, the present fire barrier laminate may comprise a first film layer (500) onto which a fibrous layer (502) is overlaid. A non-fibrous fire barrier layer (504) is coated onto the fibrous layer (502). A third adhesive layer (510) is coated onto the non-fibrous fire barrier layer (504), onto which a second film layer (506) is overlaid. In one embodiment, the third adhesive layer (510) and the second film layer (506) are absent.

Referring to FIG. 4, in an alternate embodiment, the present fire barrier laminate may comprise a scrim (507) that is laminated to the bottom surface of the first film layer (500) using a heat seal adhesive (508). A fibrous layer (502) is overlaid on to the top surface of the first film layer (500). A non-fibrous fire barrier layer (504) is coated onto the fibrous layer (502). A third adhesive layer (510) is coated onto the non-fibrous fire barrier layer (504), onto which a second film layer (506) is overlaid. In one embodiment, the third adhesive layer (510) and the second film layer (506) are absent.

Figure 5:
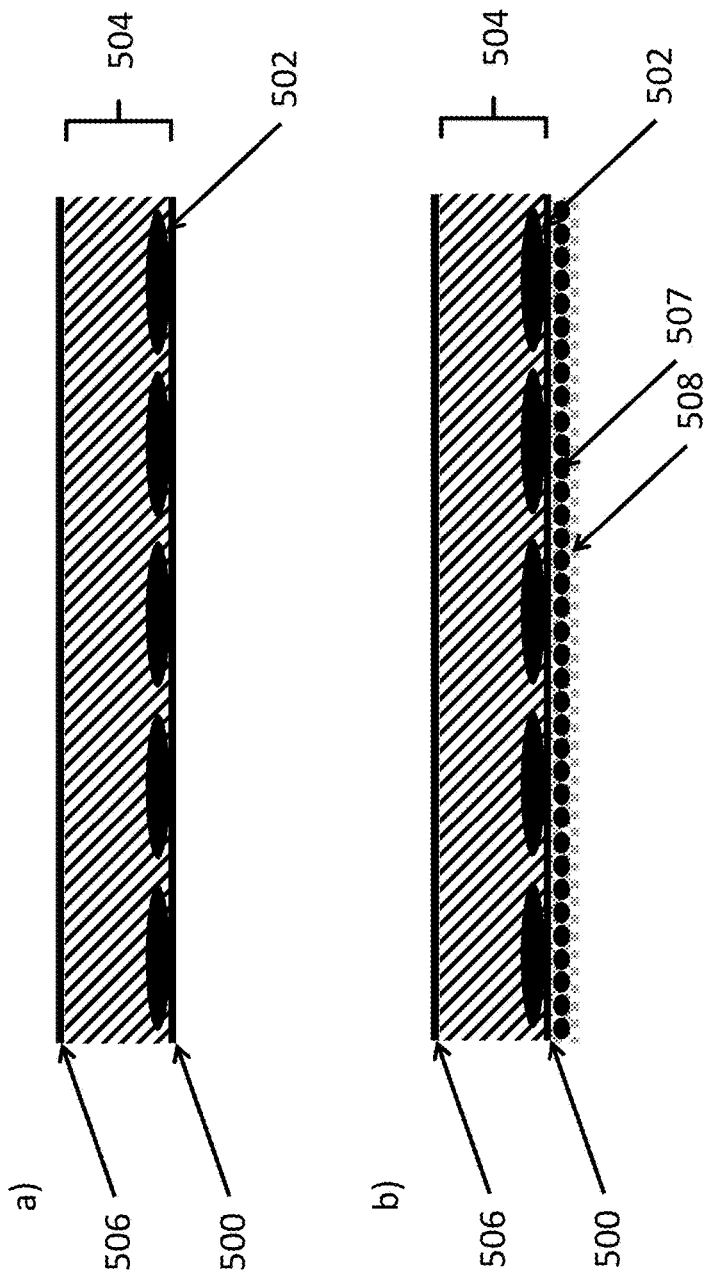
FIG. 5 depicts a further illustrative embodiment of the subject fire barrier laminate. Panel a) depicts a fire barrier laminate comprising a first film layer (500) onto which a fibrous layer (502) is overlaid. A non-fibrous fire barrier layer (504) is coated onto the fibrous layer (502). A second film layer (506) is overlaid on to the non-fibrous fire barrier layer (504). Panel b) depicts a fire barrier laminate comprising a scrim (507) that is laminated to the bottom surface of the first film layer (500) using a heat seal adhesive (508). A fibrous layer (502) is overlaid on to the top surface of the first film layer (500). A non-fibrous fire barrier layer (504) is coated onto the fibrous layer (502). A second film layer (506) is overlaid on to the non-fibrous fire barrier layer (504).

Referring to FIG. 5, in one embodiment, the present fire barrier laminate may comprise a first film layer (500) onto which a fibrous layer (502) is overlaid. A non-fibrous fire barrier layer (504) is coated onto the fibrous layer (502). A second film layer (506) is overlaid on to the non-fibrous fire barrier layer (504). In one embodiment, the second film layer (506) is absent.

Referring to FIG. 5, in an alternate embodiment, the present fire barrier laminate may comprise a scrim (507) that is laminated to the bottom surface of the first film layer (500) using a heat seal adhesive (508). A fibrous layer (502) is overlaid on to the top surface of the first film layer (500). A non-fibrous fire barrier layer (504) is coated onto the fibrous layer (502). A second film layer (506) is overlaid on to the non-fibrous fire barrier layer (504). In one embodiment, the second film layer (506) is absent.

Figure 6:
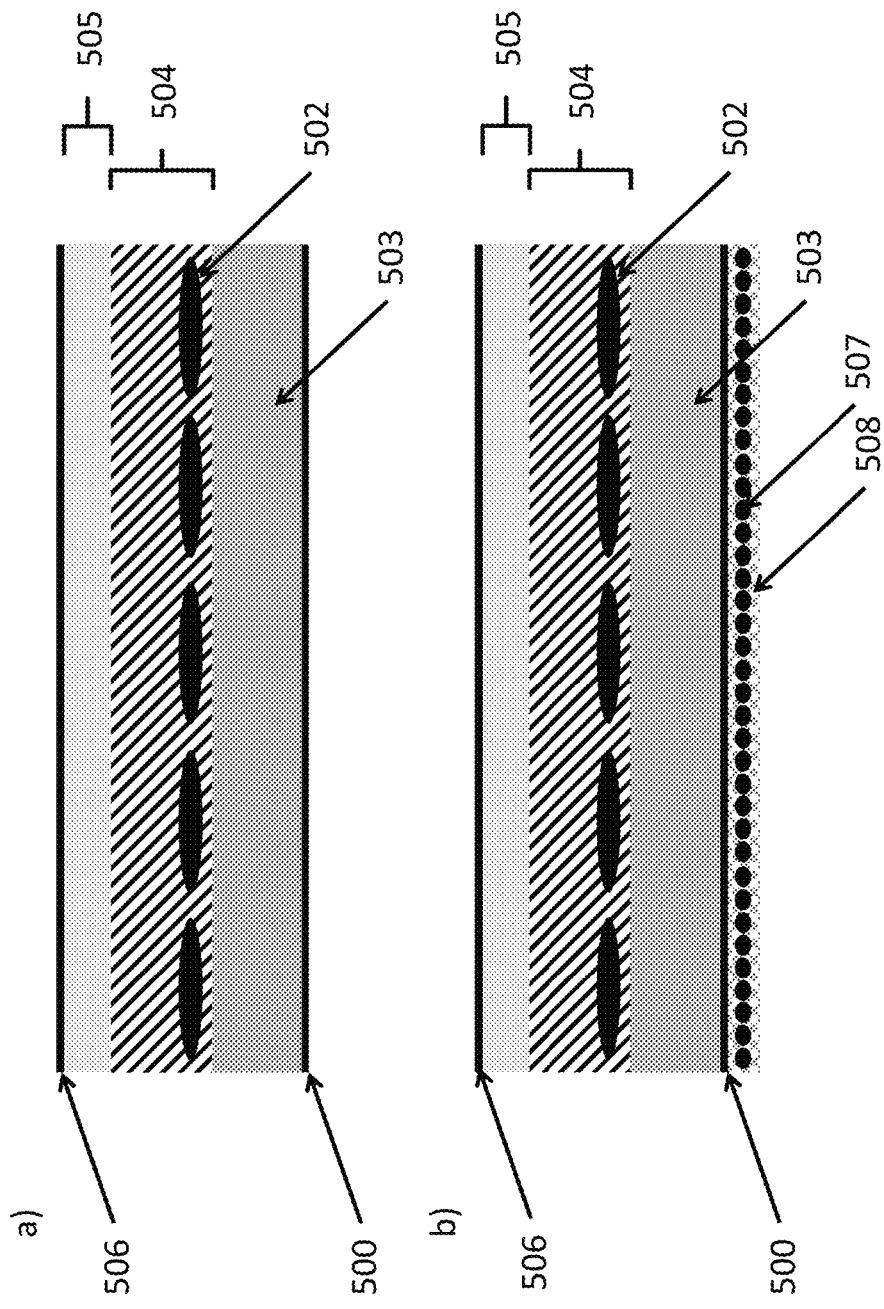
FIG. 6 depicts a further illustrative embodiment of the subject fire barrier laminate. Panel a) depicts a fire barrier laminate comprising a first film layer (500) coated with a first adhesive (503), onto which a fibrous layer (502) is overlaid. A non-fibrous fire barrier layer (504) is coated onto the fibrous layer (502). A second adhesive layer (505) is coated onto the non-fibrous fire barrier layer (504), onto which a second film layer (506) is overlaid. Panel b) depicts a fire barrier laminate comprising a scrim (507) that is laminated to the bottom surface of the first film layer (500) using a heat seal adhesive (508). The top surface of the first film layer is coated with a first adhesive (503), onto which a fibrous layer (502) is overlaid. A non-fibrous fire barrier layer (504) is coated onto the fibrous layer (502). A second adhesive layer (505) is coated onto the non-fibrous fire barrier layer (504), onto which a second film layer (506) is overlaid.

Referring to FIG. 6, in one embodiment, the present fire barrier laminate may comprise a first film layer (500) coated with a first adhesive (503), onto which a fibrous layer (502) is overlaid. A non-fibrous fire barrier layer (504) is coated onto the fibrous layer (502). A second adhesive layer (505) is coated onto the non-fibrous fire barrier layer (504), onto which a second film layer (506) is overlaid. In one embodiment, the second adhesive layer (505) and the second film layer (506) are absent.

Referring to FIG. 6, in an alternate embodiment, the present fire barrier laminate may comprise a scrim (507) that is laminated to the bottom surface of the first film layer (500) using a heat seal adhesive (508). The top surface of the first film layer is coated with a first adhesive (503), onto which a fibrous layer (502) is overlaid. A non-fibrous fire barrier layer (504) is coated onto the fibrous layer (502). A second adhesive layer (505) is coated onto the non-fibrous fire barrier layer (504), onto which a second film layer (506) is overlaid. In one embodiment, the second adhesive layer (505) and the second film layer (506) are absent.

Figure 7:
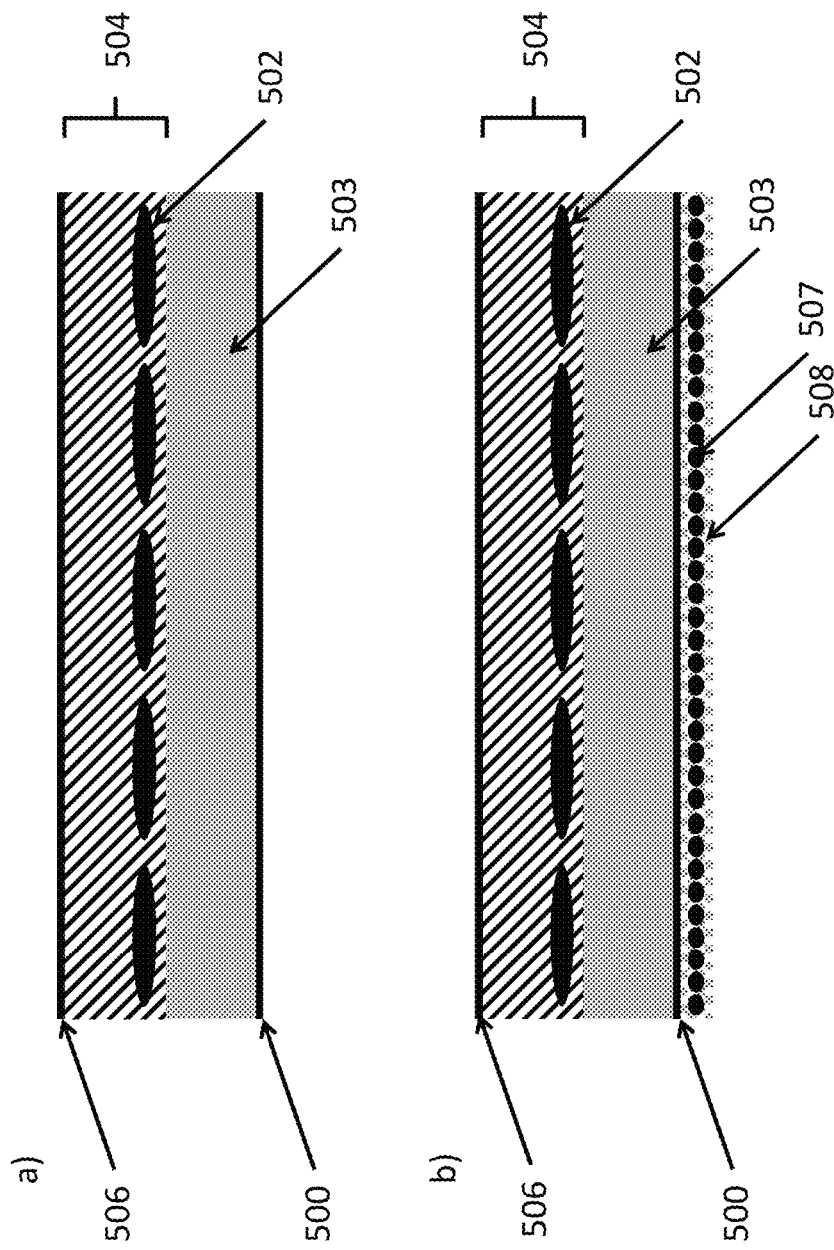
FIG. 7 depicts a further illustrative embodiment of the subject fire barrier laminate. Panel a) depicts a fire barrier laminate comprising a first film layer (500) coated with a first adhesive layer (503), onto which a fibrous layer (502) is overlaid. A non-fibrous fire barrier layer (504) is coated onto the fibrous layer (502), onto which a second film layer (506) is overlaid. Panel b) depicts a fire barrier laminate comprising a scrim (507) that is laminated to the bottom surface of the first film layer (500) using a heat seal adhesive (508). The top surface of the first film layer is coated with a first adhesive (503), onto which a fibrous layer (502) is overlaid. A non-fibrous fire barrier layer (504) is coated onto the fibrous layer (502), onto which a second film layer (506) is overlaid.

Referring to FIG. 7, in one embodiment, the present fire barrier laminate may comprise a first film layer (500) coated with a first adhesive layer (503), onto which a fibrous layer (502) is overlaid. A non-fibrous fire barrier layer (504) is coated onto the fibrous layer (502), onto which a second film layer (506) is overlaid. In one embodiment, the second film layer (506) is absent.

Referring to FIG. 7, in an alternate embodiment, the present fire barrier laminate may comprise a scrim (507) that is laminated to the bottom surface of the first film layer (500) using a heat seal adhesive (508). The top surface of the first film layer is coated with a first adhesive (503), onto which a fibrous layer (502) is overlaid. A non-fibrous fire barrier layer (504) is coated onto the fibrous layer (502), onto which a second film layer (506) is overlaid.

In one embodiment, the second film layer (506) is absent.

In one embodiment, the first adhesive (503) is a first pressure sensitive adhesive. In one embodiment, the first pressure sensitive adhesive is a silicone pressure sensitive adhesive.

In one embodiment, the second adhesive (505) is a second pressure sensitive adhesive. In one embodiment, the second pressure sensitive adhesive is a silicone pressure sensitive adhesive.

In one embodiment, the third adhesive (510) is a third pressure sensitive adhesive. In one embodiment, the second pressure sensitive adhesive is a silicone pressure sensitive adhesive.

The pressure sensitive adhesive may be utilized at any concentration. In one embodiment, the pressure sensitive adhesive is dissolved in a solvent. In one embodiment, the solvent has a dielectric constant less than 30. In one embodiment, the solvent is selected from the group consisting of xylene, IPA, acetone, ethyl acetate, toluene and combinations thereof.

In one embodiment, a scrim (507) is laminated to the bottom surface of the first film layer (500) using an adhesive (508). The scrim (507) may be in the form of a mesh, and may comprise fiberglass, nylon, polyester (such as aromatic polyester), aramid (such as para-aramid), or high or ultra-high molecular weight polyethylene, or combinations thereof.

In one embodiment, the adhesive (508) is an adhesive that requires the application of ultrasonic or radio frequency energy, or heat, or the like to activate it.

In one embodiment, the adhesive (508) is a heat seal adhesive.

In one embodiment, the scrim (507) that is laminated to the bottom surface of the first film layer (500) using an adhesive (508) is a prefabricated component, onto which the support layer (501), the non-fibrous fire barrier layer (504), second adhesive (505) and second film layer (506) is added. In one embodiment, the prefabricated component comprises a scrim and a high temperature thermoplastic film with a high strength:weight ratio. One of ordinary skill in the art can readily appreciate that any high temperature thermoplastic film with a high strength:weight ratio is suitable for use in the present invention.

In one embodiment, the high temperature thermoplastic film is comprised of a material selected from the group consisting of: polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, ethylene chlorotrifluoroethylene, and combinations thereof.

In one embodiment, the scrim (507) that is laminated to the bottom surface of the first film layer (500) using an adhesive (508) is provided prefabricated as a commercially available product, onto which the support layer (501), the non-fibrous fire barrier layer (504), second adhesive (505) and second film layer (506) is added. In one embodiment, the commercially available product is a laminate containing a polyetheretherketone film, such as the laminate sold under the trade designation LAMAGUARD 131MD. In an alternate embodiment, the commercially available product is a laminate containing a polyetheretherketone film, such as the laminate sold under the trade designation LAMAGUARD 110.

It can be readily appreciated that the present fire barrier laminates may be fabricated in any manner: i.e. the fire barrier laminate may be fabricated using the first film layer as the foundation on which all subsequent layers are added. Alternatively, the barrier laminate may be fabricated using the second film layer as the foundation on which all subsequent layers are added. Alternatively, the fire barrier laminate may be fabricated using a method where certain layers are added to the first film layer, and certain layers are added to the second film layer, forming two halves of the final laminate, and the two halves may be combined.

The non-fibrous fire-barrier layer (504) may be directly coated onto the support layer (501), for example, without limitation, by roll or reverse roll coating, gravure or reverse gravure coating, transfer coating, spray coating, brush coating, dip coating, tape casting, doctor blading, slot-die coating, or deposition coating. In certain embodiments, the non-fibrous fire-barrier layer (504) is coated onto the support layer (501) as a slurry of the ingredients in a solvent, and is allowed to dry prior to incorporation into the fire-barrier laminate. The non-fibrous fire-barrier layer (504) may be created as a single layer or coating, thus utilizing a single pass, or may be created by utilizing multiple passes, layers or coatings. If multiple passes are desired, the second and possible subsequent passes may be formed onto the first pass while the first pass is still substantially wet, i.e. prior to drying, such that the first and subsequent passes are able to form a single unitary fire barrier layer upon drying. Alternatively, if multiple passes are desired, the second and possible subsequent passes may be formed onto the first pass or each subsequent pass has dried.

When multiple passes, layers or coatings of the non-fibrous fire-barrier layer (504) are utilized, it is possible to vary the amounts of the ingredients in each pass, layer or coating, such that the passes, layers or coatings may have different amounts of, for example, the at least one inorganic pigment material. In certain embodiments, at least one pass, layer or coating having a greater amount of the at least one inorganic pigment material may be present on the "hot face" of the fire barrier layer. Further, in certain embodiments another pass, layer or coating may be formulated so as to reduce the amount of defects present in the pass, layer or coating, and may have a greater ability to correct defects present in a previous pass, layer or coating.

The fire barrier laminate may additionally include an adhesive on one of the outer surfaces to facilitate thermal or other energetic bonding of the laminate to companion backside films as currently practiced in the fabrication of thermal acoustic insulation blankets to form a covering, bag, or envelope for the insulation layers. In some embodiments, a partially or substantially totally encapsulated insulation system is formed. (Air holes may be employed to accommodate pressure variation during flight.) In certain embodiments, the adhesive comprises an adhesive which is activated by the application of ultrasonic or radio frequency energy, or the like.

In certain embodiments that may be utilized in aviation applications, the amount of materials comprising the other elements of the present fire barrier laminate are reduced, to maximize the amount of material that comprises the non-fibrous fire barrier layer (504) comprising at least one inorganic pigment material. In certain embodiments, the non-fibrous fire barrier layer (504) comprising at least one inorganic pigment material is present in a range from about 10 gsm to about 100 gsm. In certain embodiments, the non-fibrous fire barrier layer (504) comprising at least one inorganic pigment material is about 25 gsm.

In one embodiment, the fibrous layer (502) is present in the laminate in a range from about 16 gsm to about 33 gsm.

The at Least One Inorganic Pigment Material

Any inorganic pigment material that is capable of forming a non-fibrous fire-barrier layer with a resistance to heat of at least $16.0\pm0.8$ Btu/ft$^2$ sec ($18.2\pm0.9$ W/cm$^2$) and resistance to a temperature of about 1900 degrees Fahrenheit may be utilized in the present fire barrier laminate. The at least one inorganic pigment material may be any size.

While any size inorganic pigment material may be used, inorganic pigment materials with larger relative diameters and high diameter to thickness aspect ratios may be desirable due to their increased flame propagation and/or burn-through resistance performance, as well as other properties such as flexibility and processibility.

In certain embodiments, the at least one inorganic pigment material may have a diameter of from about 1 µm to about 300 μm. In further embodiments, the at least one inorganic pigment material may have a diameter of from about 1 μm to about 150 μm. In certain embodiments, the non-fibrous fire barrier layer may be formed using a preparation of inorganic pigment material of uniform particle size. In alternate embodiments, the non-fibrous fire barrier layer may be formed using a preparation of inorganic pigment material of non-uniform particle sizes.

In certain embodiments, the at least one inorganic pigment material may have an aspect ratio of from about 50:1 to about 2000:1. In certain embodiments, the at least one inorganic pigment material may have an aspect ratio of from about 50:1 to about 1000:1. In further embodiments, the at least one inorganic pigment material may have an aspect ratio of from about 200:1 to about 800:1.

In one embodiment, the at least one inorganic pigment material is a metal oxide-coated inorganic platelet material. In one embodiment, the metal oxide-coated inorganic platelet material is metal oxide-coated mica platelets. The mica can be natural or synthetic, and any platelet is suitable for use in the present fire barrier laminate. Suitable micas may include, without limitation, muscovite, phlogopite, vermiculite, suzorite, biotite, and may include synthetic micas such as fluorophlogopite.

In one embodiment the metal oxide layer coating is selected from the group consisting of titanium oxide, iron oxide, chromium oxide, tin oxide, silicon oxide, cobalt oxide, antimony oxide, and any combination thereof.

The thickness of the metal oxide coating, and/or the choice of metal oxide can be varied to alter the properties of the at least one inorganic pigment material and/or the fire barrier layer that may be formed from the at least one inorganic pigment material. The properties that may be altered include, for example, the refractive index, the heat conductivity, the heat-reflective properties of the at least one inorganic pigment material, or the wavelength(s) of electromagnetic radiation that are reflected by the at least one inorganic pigment material.

One, or more than one inorganic pigment material can be used to form the non-fibrous fire barrier layer of the present fire barrier laminate. For example, in one embodiment, the non-fibrous fire barrier layer is made using a mixture of inorganic pigment materials, wherein the mixture comprises pigments of different colors, the choice of which offers a wider spectrum of wavelengths that can be reflected than a single pigment alone. In another embodiment, the mixture comprises pigments of different sizes. In another embodiment, the mixture comprises pigments of different aspect ratios. In an alternate embodiment, the mixture comprises pigments of different sizes, colors, aspect ratio, or any combination thereof.

The at least one inorganic pigment material may be coated with an additional coating. In one embodiment, the additional coating is selected from the group consisting of silane, calcium borate, carbon black, and any combination thereof.

In one embodiment, the at least one inorganic pigment material comprises special effects pigments (also referred to as nacreous pigments). Special effects pigments comprise a metal oxide coating on a substrate platelet. In one embodiment, the substrate platelet is selected from the group consisting of silica, alumina, borosilicate and mica. The mica can be natural or synthetic, and any platelet is suitable for use in the present fire barrier laminate. Suitable micas may include, without limitation, muscovite, phlogopite, vermiculite, suzorite, biotite, and may include synthetic micas such as fluorophlogopite.

In one embodiment the metal oxide layer coating is selected from the group consisting of titanium oxide, iron oxide, chromium oxide, tin oxide, silicon oxide, cobalt oxide, antimony oxide, and any combination thereof.

The at least one inorganic pigment material may also be combined with further platelet materials, such as, for example, mica or talc. If present, further platelet may be included in the fire barrier layer in an amount from about 1 to about 50 weight percent, in certain embodiments, from about 10 to about 30 weight percent, based on the total weight of the fire-barrier layer. However, the incorporation of further platelet materials should not be detrimental to the performance of the fire-barrier layer.

In one embodiment, the at least one inorganic pigment material may also be combined with a functional filler. The functional filler(s) may include, but not be limited to, carbon fibers, carbon nanotubes, non-platelet clays (such as attapulgite, kyanite, palygorskite, silimanite, or andalucite), fumed silica, boron nitride, cordierite, solid glass microspheres, hollow glass microspheres and the like. According to certain embodiments, the functional fillers may include finely divided metal oxides, which may comprise at least one of pyrogenic silicas, arc silicas, low-alkali precipitated silicas, fumed silica, silicon dioxide aerogels, aluminum oxides, titania, calcia, magnesia, potassia, or mixtures thereof.

In certain embodiments, the functional filler may comprise endothermic fillers such as alumina trihydrate, magnesium carbonate, and other hydrated inorganic materials including cements, hydrated zinc borate, calcium sulfate (gypsum), magnesium ammonium phosphate, magnesium hydroxide and any combination thereof. In further embodiments, the functional filler(s) may include lithium-containing minerals. In still further embodiments, the functional fillers(s) may include fluxing agents and/or fusing agents.

In certain embodiments, the functional filler may comprise fire retardant fillers such as antimony compounds, magnesium hydroxide, hydrated alumina compounds, borates, carbonates, bicarbonates, inorganic halides, phosphates, sulfates, organic halogens, organic phosphates, or any combination thereof.

The Fire Barrier Layer

Without wishing to be limited by theory, the incorporation of the metal oxide coating on to the individual inorganic pigment particles may inhibit the formation of Van der Waals forces between the individual inorganic pigment particles. In fire barrier laminates utilizing fire barrier layers comprising at least one inorganic pigment material, the individual pigment particles comprising the individual inorganic pigment materials are held together by the addition of a resin or adhesive that provides cohesion between the individual inorganic pigment particles. In one embodiment, the fire barrier film consists of multiple layers of overlapping inorganic pigment particles encompassed in a resin or adhesive.

In one embodiment the at least one inorganic pigment material is formulated to form a fire barrier (504), the formulation comprises a mixture of at least one inorganic pigment material and an adhesive. To form a fire barrier layer, the mixture is then dissolved in a solvent. In one embodiment, the solvent has a dielectric constant less than 30. In one embodiment, the solvent is selected from the group consisting of xylene, IPA, acetone, ethyl acetate, toluene and combinations thereof.

It can be readily appreciated that the proportion of the adhesive added to the at least one inorganic pigment material can affect the functionality or efficacy or integrity of the non-fibrous fire-barrier comprising a film of at least one inorganic pigment material. In one embodiment, the at least one inorganic pigment material may be present from about 25% to about 99% in solid weight of the film, and the balance of the mixture comprises the adhesive. For example, the adhesive may be present in the formulation from about 1% to about 75% in solid weight of the film.

In one embodiment, the mixture comprises about 75% at least one inorganic pigment material and about 25% adhesive in solid content.

In an certain embodiments, the adhesive may be acrylic latex, (meth)acrylic latex, phenolic resins, copolymers of styrene and butadiene, vinylpyridine, acrylonitrile, copolymers of acrylonitrile and styrene, vinyl chloride, polyurethane, copolymers of vinyl acetate and ethylene, polyamides, silicones, unsaturated polyesters, epoxy resins, polyvinyl esters (such as polyvinylacetate or polyvinylbutyrate latexes) and the like.

In one embodiment, the adhesive is a pressure sensitive adhesive. In one embodiment, the pressure sensitive adhesive is a silicone pressure sensitive adhesive.

In one embodiment, the pressure sensitive adhesive is dissolved in a solvent. In one embodiment, the solvent has a dielectric constant less than 30. In one embodiment, the solvent is selected from the group consisting of xylene, IPA, acetone, ethyl acetate, toluene and combinations thereof.

In one embodiment, the fire-barrier layer (504) is formed by the evaporation of the solvent from the mixture of at least one inorganic pigment and adhesive. The integrity of the fire-barrier layer can be affected by factors, such as, for example, the ratio of at least one inorganic pigment to adhesive, the rate of evaporation of the solvent, or the thickness of the fire-barrier layer that is deposited. In one embodiment, the integrity of the fire-barrier layer is enhanced by choosing a slowly evaporating solvent.

The fire-barrier layer (504) may include inorganic binders. Without limitation, suitable inorganic binders include colloidal dispersions of alumina, silica, zirconia, and mixtures thereof. In one embodiment, the inorganic binder provides additional fire retardant and thermal conductive properties. The inorganic binders, if present, may be used in amounts ranging from 0 to about 40 percent by weight, in some embodiments from 0 to about 20 weight percent, based upon the total weight of the fire-barrier layer. However, the incorporation of inorganic binder should not be detrimental to the performance of the fire-barrier layer.

Solvents for the inorganic binder, if needed, can include a suitable organic solvent for the binder utilized. Solution strength of the binder in the solvent (if used) can be determined by conventional methods based on the binder loading desired and the workability of the binder system (viscosity, solids content, etc.).

The fire-barrier layer (504) may further include a functional filler. The functional filler(s) may include, but not be limited to, carbon fibers, carbon nanotubes, non-platelet clays (such as attapulgite, kyanite, palygorskite, silimanite, or andalucite), fumed silica, boron nitride, cordierite, solid glass microspheres, hollow glass microspheres and the like. According to certain embodiments, the functional fillers may include finely divided metal oxides, which may comprise at least one of pyrogenic silicas, arc silicas, low-alkali precipitated silicas, fumed silica, silicon dioxide aerogels, aluminum oxides, titania, calcia, magnesia, potassia, or combinations thereof.

In certain embodiments, the functional filler may comprise endothermic fillers such as alumina trihydrate, magnesium carbonate, and other hydrated inorganic materials including cements, hydrated zinc borate, calcium sulfate (gypsum), magnesium ammonium phosphate, magnesium hydroxide, or any combination thereof. In further embodiments, the functional filler(s) may include lithium-containing minerals. In still further embodiments, the functional fillers(s) may include fluxing agents and/or fusing agents.

In certain embodiments, the functional filler may comprise fire retardant fillers such as antimony compounds, magnesium hydroxide, hydrated alumina compounds, borates, carbonates, bicarbonates, inorganic halides, phosphates, sulfates, organic halogens, organic phosphates, or any combination thereof.

The functional filler, if present, may be included in the fire barrier layer in an amount of from 0 to about 40 weight percent, in some embodiments from 0 to about 20 weight percent, based upon the total weight of the fire barrier layer. However, the incorporation of functional filler should not be detrimental to the performance of the fire-barrier layer.

The Support Layer

In one embodiment, the support layer (501) provides a flexible mechanical support to the fire-barrier layer (504) of the present fire barrier laminate. For example, the support layer can isolate the fire barrier layer from the mechanical stresses of handling, installation and use. Alternatively, the support layer can isolate the fire-barrier layer from the mechanical stresses induced by the temperature-induced of the fire retardant film, that may be induced by ambient temperature changes, or, alternatively, by a fire.

In one embodiment, the support layer (501) is constructed from a material that is flame resistant. In an alternate embodiment the support layer (501) is constructed from a material that is flame retardant. In an alternate embodiment, the support layer (501) is constructed from a material that is both flame resistant and flame retardant.

In one embodiment, the support layer comprises a fibrous layer (502) and an adhesive (503). In an alternate embodiment, the support layer comprises a fibrous layer (502). Any fibrous material where the gaps between the fibers are small is suitable for use in the support layer of the fire-barrier laminate of the present fire barrier laminate, provided the fibrous layer (502) does not affect the integrity of the non-fibrous fire barrier layer (504). The fibrous material may consist of woven, non-woven, chopped fibers, or any combination thereof. The fibers may have a flat cross-sectional profile, alternatively, a round cross-sectional profile. The fibers may also comprise twisted fibers of any cross-sectional profile.

In one embodiment, the fibrous layer (502) is a glass fabric. Any glass fabric that does not affect the integrity of the non-fibrous fire barrier layer (504) is suitable for use in the support layer of the present fire-barrier laminate. The glass fabric may be constructed using woven, or non-woven fibers. In one embodiment, the support layer is constructed in a manner that reduces the cross-sectional profile of the fire-barrier laminate. In one embodiment the support layer is constructed using a glass fabric made from non-twisted fibers with a flat cross-sectional profile.

In one embodiment, the adhesive (503) is a pressure sensitive adhesive. In one embodiment, the pressure sensitive adhesive is a silicone pressure sensitive adhesive.

In one embodiment, the pressure sensitive adhesive is dissolved in a solvent. In one embodiment, the solvent has a dielectric constant less than 30. In one embodiment, the solvent is selected from the group consisting of xylene, IPA, acetone, ethyl acetate, toluene and combinations thereof.

The First and Second Film Layers

In one embodiment the first (500) and second (506) film layers are constructed from polymeric flame propagation resistant films, such as but not limited to polyesters, polyimides, polyetherketones, polyetheretherketones, polyvinylfluorides, polyamides, polytetrafluoroethylenes, polyaryl sulfones, polyester amides, polyester imides, polyethersulfones, polyphenylene sulfides, ethylene chlorotrifluoroethylene, combinations thereof, and the like. Commercially available examples of these films are films sold by E.I. DuPont de Nemours & Co. of Wilmington, Del., such as a polyester film sold under the trade designation MYLAR®, a polyvinylfluoride film sold under the trade designation TEDLAR®, and a polyimide film sold under the trade designation KAPTON®, a polyetheretherketone film sold under the trade designation APTIV® by Victrex, plc. of Lancashire, UK, a polyetheretherketone film sold under the trade designation KETASPIRE® and an ethylene chlorotrifluoroethylene film sold under the trade designation HALAR® by Solvay SA of Brussels, Belgium, or any combination thereof.

In one embodiment, the first film layer (500) is a polyetheretherketone film layer.

In one embodiment, the second film layer (506) is a polyetheretherketone film layer.

The first and/or the second film layers may be metalized to minimize moisture absorption, particularly on the outboard side, but optionally on the inboard side also.

In certain embodiments, the first and/or the second film layers may have an opaque, low-gloss polymer coating, optionally containing a fire retardant additive. The fire retardant additives may comprise at least one of antimony compounds, hydrated alumina compounds, borates, carbonates, bicarbonates, inorganic halides, phosphates, sulfates, organic halogens, organic phosphates, or any combination thereof.

Assembly of the Fire Barrier Laminates

In one embodiment, the present fire barrier laminate is constructed according to the method comprising the steps of:
a. obtaining a first film layer (500) having a top and bottom surface, and coating the top surface of the first film layer with a support layer (501) that comprises a fibrous layer (502) and a first adhesive layer (503);
b. coating the support layer (501) with a non-fibrous fire barrier layer (504);
c. coating the non-fibrous fire barrier layer (504) with a second adhesive layer (505), and
d. optionally obtaining a second film layer (506) having a top and bottom surface, and applying the second film layer (506) to the second adhesive layer (505), such that the bottom surface of the second film layer (506) is contacted with the second adhesive layer (505).

In one embodiment, a scrim (507) is laminated to the bottom surface of the first film layer (500) using an adhesive (508).

In one embodiment, the present fire barrier laminate is constructed according to the method consisting the steps of:
a. obtaining a second film layer (506) having a top and bottom surface, and applying a second adhesive layer (505) to the top surface;
b. coating the second adhesive layer (505) with a non-fibrous fire barrier layer (504);
c. coating the non-fibrous fire barrier layer (504) with a support layer (501) that comprises a fibrous layer (502) and a first adhesive layer (503); and
d. applying a first film layer (500) having a top and bottom surface to the support layer (501), such that the bottom surface of the first film layer (500) is contacted with the support layer (501).

In one embodiment, a scrim (507) is laminated to the top surface of the first film layer (500) using an adhesive (508).

In one embodiment, the present fire barrier laminate is constructed according to the method consisting the steps of:
a. obtaining a first film layer (500) having a top and bottom surface, and coating the top surface of the first film layer with a support layer (501) that comprises a fibrous layer (502) and a first adhesive layer (503);
b. coating the supporting layer (501) with a non-fibrous fire barrier layer (504); and
c. obtaining a second film layer (506) having a top and bottom surface, and applying the second film layer (506) to the non-fibrous fire barrier layer (504), such that the bottom surface of the second film layer (506) is contacted with the non-fibrous fire barrier layer (504).

In one embodiment, a scrim (507) is laminated to the bottom surface of the first film layer (500) using an adhesive (508).

In one embodiment, the present fire barrier laminate is constructed according to the method consisting the steps of:
a. obtaining a second film layer (506) having a top and bottom surface, and applying a non-fibrous fire barrier layer (504) to the top surface;
b. coating the non-fibrous fire barrier layer (504) with a support layer (501) that comprises a fibrous layer (502) and a first adhesive layer (503); and
c. applying a first film layer (500) having a top and bottom surface to the support layer (501), such that the bottom surface of the first film layer (500) is contacted with the support layer (501).

In one embodiment, a scrim (507) is laminated to the top surface of the first film layer (500) using an adhesive (508).

In one embodiment, the present fire barrier laminate is constructed according to the method consisting the steps of:
a. obtaining a first film layer (500) having a top and bottom surface, and coating the top surface of the first film layer with a fibrous layer (502);
b. coating the fibrous layer (502) with a non-fibrous fire barrier layer (504); and
c. obtaining a second film layer (506) having a top and bottom surface, and applying the second film layer (506) to the non-fibrous fire barrier layer (504), such that the bottom surface of the second film layer (506) is contacted with the non-fibrous fire barrier layer (504).

In one embodiment, a scrim (507) is laminated to the bottom surface of the first film layer (500) using an adhesive (508).

In one embodiment, the present fire barrier laminate is constructed according to the method consisting the steps of:
a. obtaining a second film layer (506) having a top and bottom surface, and applying a non-fibrous fire barrier layer (504) to the top surface;
b. applying a fibrous layer (502) to the non-fibrous fire barrier layer (504); and c. applying a first film layer (500) having a top and bottom surface to the support layer (501), such that the bottom surface of the first film layer (500) is contacted with the fibrous layer (502).

In one embodiment, a scrim (507) is laminated to the top surface of the first film layer (500) using an adhesive (508).

In one embodiment, the present fire barrier laminate is constructed according to the method consisting the steps of:
a. obtaining a first film layer (500) having a top and bottom surface, and coating the top surface of the first film layer with a fibrous layer (502);
b. coating the fibrous layer (502) with a non-fibrous fire barrier layer (504);
c. coating the non-fibrous fire barrier layer (504) with a third adhesive layer (510); and
d. obtaining a second film layer (506) having a top and bottom surface, and applying the second film layer (506) to the third adhesive layer (510), such that the bottom surface of the second film layer (506) is contacted with the third adhesive layer (510).

In one embodiment, a scrim (507) is laminated to the bottom surface of the first film layer (500) using an adhesive (508).

In one embodiment, the present fire barrier laminate is constructed according to the method consisting the steps of:
a. obtaining a second film layer (506) having a top and bottom surface, and applying a third adhesive layer (510) to the top surface;
b. coating the third adhesive layer (510) with a non-fibrous fire barrier layer (504);
c. applying a fibrous layer (502) to the non-fibrous fire barrier layer (504); and
d. applying a first film layer (500) having a top and bottom surface to the support layer (501), such that the bottom surface of the first film layer (500) is contacted with the fibrous layer (502).

In one embodiment, a scrim (507) is laminated to the top surface of the first film layer (500) using an adhesive (508).

In one embodiment, the present fire barrier laminate is constructed according to the method consisting the steps of:
a. obtaining a first film layer (500) having a top and bottom surface, and coating the top surface of the first film layer with a first adhesive layer (503);
b. coating the first adhesive layer (503) with a fibrous layer (502);
c. coating the fibrous layer (502) with a non-fibrous fire barrier layer (504);
d. coating the non-fibrous fire barrier layer (504) with a second adhesive layer (505); and
e. obtaining a second film layer (506) having a top and bottom surface, and applying the second film layer (506) to the second adhesive layer (505), such that the bottom surface of the second film layer (506) is contacted with the second adhesive layer (505).

In one embodiment, a scrim (507) is laminated to the bottom surface of the first film layer (500) using an adhesive (508).

In one embodiment, the present fire barrier laminate is constructed according to the method consisting the steps of:
a. obtaining a second film layer (506) having a top and bottom surface, and applying a second adhesive layer (505) to the top surface;
b. coating the second adhesive layer (505) with a non-fibrous fire barrier layer (504);
c. coating the non-fibrous fire barrier layer (504) with a fibrous layer (502);
d. coating the fibrous layer (502) with a first adhesive layer (503); and
e. applying a first film layer (500) having a top and bottom surface to first adhesive layer (503), such that the bottom surface of the first film layer (500) is contacted with first adhesive layer (503).

In one embodiment, a scrim (507) is laminated to the top surface of the first film layer (500) using an adhesive (508).

In one embodiment, the present fire barrier laminate is constructed according to the method consisting the steps of:
a. obtaining a first film layer (500) having a top and bottom surface, and coating the top surface of the first film layer with a first adhesive layer (503);
b. coating the first adhesive layer (503) with a fibrous layer (502);
c. coating the fibrous layer (502) with a non-fibrous fire barrier layer (504); and
d. obtaining a second film layer (506) having a top and bottom surface, and applying the second film layer (506) to the non-fibrous fire barrier layer (504), such that the bottom surface of the second film layer (506) is contacted with non-fibrous fire barrier layer (504).

In one embodiment, a scrim (507) is laminated to the bottom surface of the first film layer (500) using an adhesive (508).

In one embodiment, the present fire barrier laminate is constructed according to the method consisting the steps of:
a. obtaining a second film layer (506) having a top and bottom surface, and applying a non-fibrous fire barrier layer (504) to the top surface;
b. applying a fibrous layer (502) to the non-fibrous fire barrier layer (504);
c. coating the fibrous layer (502) with a first adhesive layer (503); and
d. applying a first film layer (500) having a top and bottom surface to first adhesive layer (503), such that the bottom surface of the first film layer (500) is contacted with first adhesive layer (503).

In one embodiment, a scrim (507) is laminated to the top surface of the first film layer (500) using an adhesive (508).

The present fire barrier laminate is further illustrated, but not limited by, the following examples.

EXAMPLES

Example 1

Sample 1 comprised a fire barrier layer containing suspended exfoliated vermiculite flakes, silicone binder and water. The fire barrier layer was applied to a polyetheretherketone (PEEK) film, which had previously been coated with a silicone adhesive and allowed to dry. Separately, a second PEEK film was laminated to a nylon scrim using a silicone laminating adhesive. The scrim side of the laminate was laminated to the fire barrier layer side of the fire barrier layer-coated PEEK film to form a fire barrier laminate. A heat seal adhesive was then applied to the face of the fire barrier laminate opposite the second PEEK film. The fire barrier laminate final construction had a basis weight of 97 gsm and passed the test protocols of 14 C.F.R. §25.856(a) and (b), described below.

Sample 2 comprised a fire barrier layer containing suspended exfoliated vermiculite flakes and water. The fire barrier layer was applied to a polyetheretherketone (PEEK) film which had previously been coated with a modified natural rubber adhesive and allowed to dry. Separately, a second PEEK film was laminated to a nylon scrim using a poly(amide) laminating adhesive. The scrim side of the laminate was laminated to the fire barrier layer side of the fire barrier layer-coated PEEK film to form a fire barrier laminate. A heat seal adhesive was then applied to the face of the fire barrier laminate opposite the second PEEK film and a fiberglass scrim was incorporated onto the heat seal adhesive-coated face. The fire barrier laminate final construction had a basis weight of 90 gsm and passed the test protocols of 14 C.F.R. §25.856(a) and (b), described below.

Sample 3 comprised a fire barrier layer containing suspended exfoliated vermiculite flakes, silicone binder and water. The fire barrier layer was applied to a polyetheretherketone (PEEK) film which had previously been coated with a modified natural rubber adhesive and allowed to dry. Separately, a second PEEK film was laminated to a nylon scrim using a poly(amide) laminating adhesive. The scrim side of the laminate was laminated to the fire barrier layer side of the fire barrier layer-coated PEEK film to form a fire barrier laminate. A heat seal adhesive was then applied to the face of the fire barrier laminate opposite the second PEEK film. The fire barrier laminate final construction had a basis weight of 103 gsm and passed the test protocols of 14 C.F.R. §25.856(a) and (b), described below.

Sample 4 comprised a fire barrier layer containing suspended exfoliated vermiculite flakes, silicone binder and water. The fire barrier layer was applied to a polyetheretherketone (PEEK) film which had previously been coated with a modified natural rubber adhesive and allowed to dry. Separately, an ethylene chlorotrifluoroethylene (ECTFE) film was laminated to a nylon scrim using a silicone laminating adhesive. The scrim side of the laminate was laminated to the fire barrier layer side of the fire barrier layer-coated PEEK film to form a fire barrier laminate. A heat seal adhesive was then applied to the external face of the ECTFE film. The fire barrier laminate final construction had a basis weight of 95 gsm and passed the test protocols of 14 C.F.R. §25.856(a) and (b), described below.

Sample 5 comprised a fire barrier layer containing suspended exfoliated vermiculite flakes and water. The fire barrier layer was applied to a polyetheretherketone (PEEK) film which had previously been coated with a modified natural rubber adhesive and allowed to dry. Separately, a second PEEK film was laminated to a nylon scrim using a silicone laminating adhesive. The scrim side of the laminate was laminated to the fire barrier layer side of the fire barrier layer-coated PEEK film to form a fire barrier laminate. A heat seal adhesive was then applied to the face of the fire barrier laminate opposite the second PEEK film and a nylon scrim was incorporated onto the heat seal adhesive-coated face. The fire barrier laminate final construction had a basis weight of 105 gsm and passed the test protocols of 14 C.F.R. §25.856(a) and (b), described below.

Samples containing a fire barrier laminate comprising at least one inorganic pigment material were also constructed and their fire retardant properties were tested, either using the FAA protocol described in paragraphs [0256] to [0312] ("FAA"), or using a corresponding protocol that is analogous to the protocol of 14 C.F.R. §§25.856(a) and (b), Appendix F, Parts VI and VII ("Analogous Protocol"). A summary of the fire barrier laminates tested, the protocols used, and the results may be found in Table 1.

TABLE 1

Summary of Samples Comprising Various Embodiments of Fire Barrier Laminates

| Sample No | Support Layer (501) | | | | | Non-fibrous Fire Barrier Layer (504) | | | | | | |
|---|---|---|---|---|---|---|---|---|---|---|---|---|
| | Scrim (507) | Adhesive (508) | First Film Layer (500) | First Adhesive Layer (503) | Fibrous Layer (503) | Inorganic Platelet/Pigment | Adhesive | Filler | Second Adhesive Layer (505) | Second Film Layer (506) | Tested | Result |
| 6 | Nylon scrim | Heat seal | PEEK | silicone adhesive | glass fabric | 75% Pigment 1 to 25% adhesive in solid content | silicone adhesive | None | silicone adhesive | PEEK | Analogous Protocol | Pass |
| 7 | Nylon scrim | Heat seal | PEEK | silicone adhesive | glass fabric | 75% Pigment 2 to 25% adhesive in solid content | silicone adhesive | None | silicone adhesive | PEEK | Analogous Protocol | Pass |
| 8 | Nylon scrim | Heat seal | PEEK | silicone adhesive | glass fabric | 75% Pigment 3 to 25% adhesive in solid content | silicone adhesive | None | silicone adhesive | PEEK | Analogous Protocol | Pass |
| 9 | Nylon scrim | Heat seal | PEEK | silicone adhesive | glass fabric | 75% Pigment 1 to 25% adhesive in solid content | silicone adhesive | None | None | None | Analogous Protocol | Pass |
| 10 | Nylon scrim | Heat seal | PEEK | silicone adhesive | glass fabric | 75% Pigment 2 to 25% adhesive in solid content | silicone adhesive | None | None | None | Analogous Protocol | Pass |

TABLE 1-continued

Summary of Samples Comprising Various Embodiments of Fire Barrier Laminates

| | Support Layer (501) | | | | | Non-fibrous Fire Barrier Layer (504) | | | Second | | | |
|---|---|---|---|---|---|---|---|---|---|---|---|---|
| | | | | First | | | | | | | | |
| Sample No | Scrim (507) | Adhesive (508) | First Film Layer (500) | Adhesive Layer (503) | Fibrous Layer (503) | Inorganic Platelet/ Pigment | Adhesive | Filler | Second Adhesive Layer (505) | Film Layer (506) | Tested | Result |
| 11 | Nylon scrim | Heat seal | PEEK | silicone adhesive | glass fabric | 75% Pigment 3 to 25% adhesive in solid content | silicone adhesive | None | None | None | Analogous Protocol | Pass |
| 12 | Nylon scrim | Heat seal | PEEK | silicone adhesive | glass fabric | 75% Pigment 3 to 25% adhesive in solid content | silicone adhesive | None | silicone adhesive | PEEK | Analogous Protocol | Pass |
| 13 | Nylon scrim | Heat seal | PEEK | silicone adhesive | glass fabric | 75% Pigment 4 to 25% adhesive in solid content | silicone adhesive | None | None | None | Analogous Protocol | Pass |
| 14 | Nylon scrim | Heat seal | PEEK | silicone adhesive | glass fabric | 75% Pigment 5 to 25% adhesive in solid content | silicone adhesive | None | None | None | Analogous Protocol | Pass |
| 15 | Nylon scrim | Heat seal | PEEK | silicone adhesive | glass fabric | 75% Pigment 6 to 25% adhesive in solid content | silicone adhesive | None | None | None | Analogous Protocol | Pass |
| 16 | Nylon scrim | Heat seal | PEEK | silicone adhesive | glass fabric | 75% Pigment 7 to 25% adhesive in solid content | silicone adhesive | None | None | None | Analogous Protocol | Pass |
| 17 | Nylon scrim | Heat seal | PEEK | silicone adhesive | glass fabric | 75% Pigment 8 to 25% adhesive in solid content | silicone adhesive | None | None | None | Analogous Protocol | Pass |
| 18 | Nylon scrim | Heat seal | PEEK | silicone adhesive | glass fabric | 75% Pigment 9 to 25% adhesive in solid content | silicone adhesive | None | None | None | Analogous Protocol | Pass |
| 19 | Nylon scrim | Heat seal | PEEK | silicone adhesive | glass fabric | 75% Pigment 10 to 25% adhesive in solid content | silicone adhesive | None | None | None | Analogous Protocol | Pass |
| 20 | Nylon scrim | Heat seal | PEEK | silicone adhesive | glass fabric | 75% Pigment 11 to 25% adhesive in solid content | silicone adhesive | None | None | None | Analogous Protocol | Fail |
| 21 | Nylon scrim | Heat seal | PEEK | silicone adhesive | glass fabric | 75% Pigment 3 to 25% adhesive in solid content | silicone adhesive | None | silicone adhesive | PEEK | FAA | Pass |
| 22 | Nylon scrim | Heat seal | PEEK | silicone adhesive | glass fabric | 37.5% Pigment 3, 37.5% of Pigment 8 | silicone adhesive | None | None | None | Analogous Protocol | Pass |

TABLE 1-continued

Summary of Samples Comprising Various Embodiments of Fire Barrier Laminates

| | Support Layer (501) | | | | Non-fibrous Fire Barrier Layer (504) | | | | | | |
|---|---|---|---|---|---|---|---|---|---|---|---|
| Sample No | Scrim (507) | Adhesive (508) | First Film Layer (500) | First Adhesive Layer (503) | Fibrous Layer (503) | Inorganic Platelet/ Pigment | Adhesive | Filler | Second Adhesive Layer (505) | Second Film Layer (506) | Tested | Result |
| 23 | Nylon scrim | Heat seal | PEEK | silicone adhesive | glass fabric | to 25% adhesive in solid content 37.5% Pigment 3, 37.5% Pigment 5 to 25% adhesive in solid content | silicone adhesive | None | None | None | Analogous Protocol | Pass |
| 24 | Nylon scrim | Heat seal | PEEK | silicone adhesive | glass fabric | 75% Pigment 3 to 25% adhesive in solid content | silicone adhesive | glass bubbles | silicone adhesive | PEEK | No | |
| 25 | Nylon scrim | Heat seal | PEEK | silicone adhesive | glass fabric | 75% Pigment 3 to 25% adhesive in solid content | silicone adhesive | glass spheres | silicone adhesive | PEEK | No | |
| 26 | Nylon scrim | Heat seal | PEEK | silicone adhesive | glass fabric | 75% Pigment 3 to 25% adhesive in solid content | silicone adhesive | carbon nanotubes | silicone adhesive | PEEK | No | |

Sample 6 comprised a polyetheretherketone (PEEK) film, which had been laminated with a scrim layer on one side of the PEEK film and a heat seal, and the opposite side coated with silicone adhesive diluted into solvent, applied by reverse roll coating and laminated with glass fabric. A fire barrier layer comprising 75% solid of a silver colored pigment comprising $TiO_2$-coated mica platelets, with a particle size ranging between 10-60 µm (chemical composition of 66-74% mica, 26-33% $TiO_2$ and 0-1% $SnO_2$) (Pigment 1) to 25% solid silicone adhesive diluted into solvent was applied to the glass fabric layer by gravure roll coating in two passes. A coating of silicone adhesive diluted into solvent was applied to the fire barrier layer by reverse roll coating and laminated with a second PEEK film, reaching a total weight of 2.99 osy.

Sample 7 comprised a polyetheretherketone (PEEK) film, which had been laminated with a scrim layer on one side of the PEEK film, and the opposite side coated with silicone adhesive diluted into solvent, applied by reverse roll coating and laminated with glass fabric. A fire barrier layer comprising 75% solid of a weather resistant silver colored pigment comprising $TiO_2$-coated mica platelets, with a particle size ranging between 4-40 µm (chemical composition of 66-73% mica, 27-32% $TiO_2$ and 0-2% $SnO_2$) (Pigment 2) to 25% solid silicone adhesive diluted into solvent was applied to the glass fabric layer by gravure roll coating in two passes. A coating of silicone adhesive diluted into solvent was applied to the fire barrier layer by reverse roll coating and laminated with a second PEEK film, reaching a total weight of 2.95 osy.

Sample 8 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid of a silver colored pigment comprising $TiO_2$-coated mica platelets, with a particle size ranging between 15-70 µm (chemical composition of 68-77% mica, 23-31% $TiO_2$, less than 1% chromium (HI) and less than 1% $SnO_2$) (Pigment 3) to 25% solid silicone adhesive diluted into solvent was applied to the glass fabric layer by gravure roll coating in two passes. A coating of silicone adhesive diluted into solvent was applied to the fire barrier layer by gravure roll coating and laminated with a second PEEK film, reaching a total weight of 3.02 osy.

Sample 9 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid Pigment 1 to 25% solid silicone adhesive diluted into solvent was applied to the glass fabric layer by gravure roll coating in two passes.

Sample 10 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid Pigment 2 to 25% solid silicone adhesive diluted into solvent was applied to the glass fabric layer by gravure roll coating in two passes.

Sample 11 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid Pigment 3 to 25% solid silicone adhesive diluted into solvent was applied to the glass fabric layer by gravure roll coating in two passes.

Sample 12 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid Pigment 3 to 25% solid silicone adhesive diluted into solvent was applied to the glass fabric layer by gravure roll coating in two passes. A coating of silicone adhesive diluted into solvent was applied to the fire barrier layer by gravure roll coating and laminated with a second PEEK film, reaching a total weight of 3.05 osy.

Sample 13 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid of a pigment comprising $TiO_2$-coated mica platelets, with a particle size ranging between 10-50 μm (chemical composition of 66-74% mica, 26-32% $TiO_2$, less than 0.5% chromium (III) and less than 1% $SnO_2$) (Pigment 4) to 25% solid silicone adhesive diluted into solvent was applied to the glass fabric layer by gravure roll coating in two passes.

Sample 14 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid of a silver colored weather resistant pigment comprising $TiO_2$-coated mica platelets, with a particle size ranging between 1-15 μm (chemical composition of 42-54% mica, 46-47% $TiO_2$, less than 0.5% chromium (III) and less than 1% $SnO_2$) (Pigment 5) to 25% solid silicone adhesive diluted into solvent was applied to the glass fabric layer by gravure roll coating in two passes.

Sample 15 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid of a silver colored pigment comprising $TiO_2$-coated mica platelets, with a particle size ranging between 10-60 μm (chemical composition of 69-73% mica, 27-31% $TiO_2$, and 0-1% $SnO_2$) (Pigment 6) to 25% solid silicone adhesive diluted into solvent was applied to the glass fabric layer by gravure roll coating in two passes.

Sample 16 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid of a green pigment comprising $TiO_2$-coated mica platelets, with a particle size ranging between 10-60 μm (chemical composition 41-50% mica, 50-58% $TiO_2$ and 0-1% $SnO_2$) (Pigment 7) to 25% solid silicone adhesive diluted into solvent was applied to the glass fabric layer by gravure roll coating in two passes.

Sample 17 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid of a green colored pigment comprising $TiO_2$-coated mica platelets, with a particle size ranging between 15-70 μm (chemical composition of 45-59% mica, and 41-54% $TiO_2$ (Pigment 8) to 25% solid silicone adhesive diluted into solvent was applied to the glass fabric layer by gravure roll coating in two passes.

Sample 18 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid of a copper colored pigment comprising $Fe_2O_3$-coated mica platelets, with a particle size ranging between 10-70 μm (chemical composition of 55-66% mica, and 34-45% $Fe_2O_3$ (Pigment 9) to 25% solid silicone adhesive diluted into solvent was applied to the glass fabric layer by gravure roll coating in two passes.

Sample 19 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid of a weather resistant pigment comprising $TiO_2$-coated synthetic mica platelets, with a particle size ranging between 9-41 μm (chemical composition of 20-30% $TiO_2$) (Pigment 10) to 25% solid silicone adhesive diluted into solvent was applied to the glass fabric layer by gravure roll coating in two passes.

Sample 20 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid of a silver colored pigment comprising $TiO_2$ coated borosilicate platelets, with a particle size ranging between 30-100 μm (chemical composition of 5-15% $TiO_2$) (Pigment 11) to 25% solid silicone adhesive diluted into solvent was applied to the glass fabric layer by gravure roll coating in two passes.

Sample 21 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 75% solid Pigment 3 to 25% solid silicone adhesive diluted into solvent was applied to the glass fabric layer by gravure roll coating in two passes. A coating of silicone adhesive diluted into solvent was applied to the fire barrier layer by gravure roll coating and laminated with a second PEEK film, reaching a total weight of 2.95 osy.

Sample 22 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 37.5 solid Pigment 3, and 37.5 solid Pigment 8 to 25% solid silicone adhesive diluted into solvent was applied to the glass fabric layer by gravure roll coating in two passes.

Sample 23 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 37.5 solid Pigment 3, and 37.5 solid Pigment 5 to 25% solid silicone adhesive diluted into solvent was applied to the glass fabric layer by gravure roll coating in two passes.

Sample 24 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 70% solid Pigment 3 to 25% solid silicone adhesive diluted into solvent and a filler comprising 5% solid glass bubbles was applied to the glass fabric layer by gravure roll coating in two passes.

Sample 25 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 70% solid Pigment 3 to 20% solid silicone adhesive diluted into solvent and a filler comprising 10% solid glass spheres was applied to the glass fabric layer by gravure roll coating in two passes.

Sample 26 comprised a polyetheretherketone (PEEK) film, which had been laminated with a scrim layer on one side of the PEEK film, and the opposite side coated with silicone adhesive diluted into solvent, applied by gravure roll coating and laminated with glass fabric. A fire barrier layer comprising 73% Pigment 3 to 25% silicone adhesive diluted into solvent and a filler comprising 2% carbon nanotubes was applied to the glass fabric layer by gravure roll coating in two passes.

For testing according to 14 C.F.R. §25.856(a), the fire barrier laminate of each of the Samples 1-5 were used to encapsulate two (2) 1 inch layers of 0.34 pcf MICROLITE AA® premium fiberglass insulation with LAMAGUARD® 131MD companion polymer film. The fire barrier laminate was heat sealed in order to encapsulate the fiberglass insulation.

For testing according to 14 C.F.R. §25.856(b) the fire barrier laminate of each of the Samples 1-5 were used to encapsulate one (1) 1 inch layer of 0.34 pcf MICROLITE AA® premium fiberglass insulation with LAMAGUARD® 131MD companion polymer film. The fire barrier laminate was mechanically sealed using staples in order to encapsulate the fiberglass insulation.

The ability of samples of the present fire barrier laminate to resist the absorption of water was also tested. The protocols utilized were as follows: In one test, samples of the fire barrier laminates were weighed, then completely immersed in 23° C. water for 72 h. After this time, the samples were re-weighed. The results were compared to the Airbus Industrie Standard AIMS04-18-000 clause 4.2.2.8.6, requiring the increase in weight to exceed 6% following immersion.

In another test, samples of the fire barrier laminates were weighed, then completely immersed in 23° C. water for 24 h, followed by complete immersion in 40° C. water for 1 h, followed by complete immersion in 23° C. water for 24 h. After this time, the samples were re-weighed. The results were compared to the Airbus Industrie Standard AIMS04-18-000 clause 4.2.2.8.7, requiring the increase in weight to exceed 6% following immersion.

In another test, water absorption, measured by capillary rise was tested. The distance of water absorbed into samples of the fire barrier laminates by capillary action was measured in the transverse and longitudinal direction. The results were compared to the ISO9073-6 standard, requiring that no water be absorbed by capillary action after 60 s of immersion.

The water absorption observed did not exceed the permitted levels in any of Samples 6-26, under the conditions tested.

Test Protocols Set Forth in 14 C.F.R. §25.856(a) and (b), Appendix F, Parts VI and VII The fire barrier film laminate-protected thermal/acoustic insulation blankets described above were tested according to the protocols of 14 C.F.R. §25.856(a) and (b), Appendix F, Parts VI and VII, which are incorporated herein in their entirety, as if fully written out below.

14 C.F.R. §25.856(a) and (b) provide in pertinent part:
Table 2: §25.856 Thermal/Acoustic insulation materials.
(a) Thermal/acoustic insulation material installed in the fuselage must meet the flame propagation test requirements of part VI of Appendix F to this part, or other approved equivalent test requirements.
(b) For airplanes with a passenger capacity of 20 or greater, thermal/acoustic insulation materials (including the means of fastening the materials to the fuselage) installed in the lower half of the airplane fuselage must meet the flame penetration resistance test requirements of part VII of Appendix F to this part, or other approved equivalent test requirements.

Appendix F Part VI provides, in pertinent part:
Table 3: Part VI—Test Method to Determine the Flammability and Flame Propagation Characteristics of Thermal Acoustic Insulation Materials Use this test method to evaluate the flammability and flame propagation characteristics of thermal/acoustic insulation when exposed to both a radiant heat source and a flame.

(a) Definitions.

"Flame propagation" means the furthest distance of the propagation of visible flame towards the far end of the test specimen, measured from the midpoint of the ignition source flame. Measure this distance after initially applying the ignition source and before all flame on the test specimen is extinguished. The measurement is not a determination of burn length made after the test.

"Radiant heat source" means an electric or air propane panel.

"Thermal/acoustic insulation" means a material or system of materials used to provide thermal and/or acoustic protection. Examples include fiberglass or other batting material encapsulated by a film covering and foams.

"Zero point" means the point of application of the pilot burner to the test specimen.

(b) Test Apparatus.
(4) Pilot Burner.

The pilot burner used to ignite the specimen must be a Bemzomatic™ commercial propane venturi torch with an axially symmetric burner tip and a propane supply tube with an orifice diameter of 0.006 inches (0.15 mm). The length of the burner tube must be 2⅞ inches (71 mm). The propane flow must be adjusted via gas pressure through an in-line regulator to produce a blue inner cone length of ¾ inch (19 mm). A ¾ inch (19 mm) guide (such as a thin strip of metal) may be soldered to the top of the burner to aid in setting the flame height. The overall flame length must be approximately 5 inches long (127 mm). Provide a way to move the burner out of the ignition position so that the flame is horizontal and at least 2 inches (50 mm) above the specimen plane.

(5) Thermocouples.

Install a 24 American Wire Gauge (AWG) Type K (Chromel-Alumel) thermocouple in the test chamber for temperature monitoring. Insert it into the chamber through a small hole drilled through the back of the chamber. Place the thermocouple so that it extends 11 inches (279 mm) out from the back of the chamber wall, 11½ inches (292 mm) from the right side of the chamber wall, and is 2 inches (51 mm) below the radiant panel. The use of other thermocouples is optional.

(6) Calorimeter.

The calorimeter must be a one-inch cylindrical water-cooled, total heat flux density, foil type Gardon Gage that has a range of 0 to 5 BTU/ft$^2$-second (0 to 5.7 Watts/cm$^2$).

(c) Test Specimens.

(1) Specimen Preparation.

Prepare and test a minimum of three test specimens. If an oriented film cover material is used, prepare and test both the warp and fill directions.

(2) Construction.

Test specimens must include all materials used in construction of the insulation (including batting, film, scrim, tape etc.). Cut a piece of core material such as foam or fiberglass, and cut a piece of film cover material (if used) large enough to cover the core material. Heat sealing is the preferred method of preparing fiberglass samples, since they can be made without compressing the fiberglass ("box sample"). Cover materials that are not heat sealable may be stapled, sewn, or taped as long as the cover material is over-cut enough to be drawn down the sides without compressing the core material. The fastening means should be as continuous as possible along the length of the seams. The specimen thickness must be of the same thickness as installed in the airplane.

(3) Specimen Dimensions.

To facilitate proper placement of specimens in the sliding platform housing, cut non-rigid core materials, such as fiberglass, 12½ inches (318 mm) wide by 23 inches (584 mm) long. Cut rigid materials, such as foam, 11½±¼ inches (292 mm±6 mm) wide by 23 inches (584 mm) long in order to fit properly in the sliding platform housing and provide a flat, exposed surface equal to the opening in the housing.

(d) Specimen Conditioning.

Condition the test specimens at 70±5° F. (21°±2° C.) and 55%±10% relative humidity, for a minimum of 24 hours prior to testing.

(f) Test Procedure.

(1) Ignite the Pilot Burner. Ensure that it is at least 2 inches (51 mm) above the top of the platform. The burner must not contact the specimen until the test begins.

(2) Place the test specimen in the sliding platform holder. Ensure that the test sample surface is level with the top of the platform. At "zero" point, the specimen surface must be 7½ inches±⅛ inch (191 mm±3) below the radiant panel.

(3) Place the retaining/securing frame over the test specimen. It may be necessary (due to compression) to adjust the sample (up or down) in order to maintain the distance from the sample to the radiant panel (7½ inches±⅛ inch (191 mm±3) at "zero" position). With film/fiberglass assemblies, it is critical to make a slit in the film cover to purge any air inside. This allows the operator to maintain the proper test specimen position (level with the top of the platform) and to allow ventilation of gases during testing. A longitudinal slit, approximately 2 inches (51 mm) in length, must be centered 3 inches±½ inch (76 mm±13 mm) from the left flange of the securing frame. A utility knife is acceptable for slitting the film cover.

(4) Immediately push the sliding platform into the chamber and close the bottom door.

(5) Bring the pilot burner flame into contact with the center of the specimen at the "zero" point and simultaneously start the timer. The pilot burner must be at a 27° angle with the sample and be approximately ½ inch (12 mm) above the sample. A stop . . . allows the operator to position the burner correctly each time.

(6) Leave the burner in position for 15 seconds and then remove to a position at least 2 inches (51 mm) above the specimen.

(g) Report.

(1) Identify and describe the test specimen.

(2) Report any shrinkage or melting of the test specimen.

(3) Report the flame propagation distance. If this distance is less than 2 inches, report this as a pass (no measurement required).

(4) Report the after-flame time.

(h) Requirements.

(1) There must be no flame propagation beyond 2 inches (51 mm) to the left of the centerline of the pilot flame application.

(2) The flame time after removal of the pilot burner may not exceed 3 seconds on any specimen.

Appendix F Part VII provides, in pertinent part:

Table 4: Part VII—Test Method To Determine the Burnthrough Resistance of Thermal/Acoustic Insulation Materials Use the following test method to evaluate the burnthrough resistance characteristics of aircraft thermal/acoustic insulation materials when exposed to a high intensity open flame.

(a) Definitions.

"Burnthrough time" means the time, in seconds, for the burner flame to penetrate the test specimen, and/or the time required for the heat flux to reach 2.0 Btu/ft$^2$sec (2.27 W/cm$^2$) on the inboard side, at a distance of 12 inches (30.5 cm) from the front surface of the insulation blanket test frame, whichever is sooner. The burnthrough time is measured at the inboard side of each of the insulation blanket specimens.

"Insulation blanket specimen" means one of two specimens positioned in either side of the test rig, at an angle of 30° with respect to vertical.

"Specimen set" means two insulation blanket specimens. Both specimens must represent the same production insulation blanket construction and materials, proportioned to correspond to the specimen size.

(b) Apparatus.

(3) Calibration rig and equipment.

(i) Construct individual calibration rigs to incorporate a calorimeter and thermocouple rake for the measurement of heat flux and temperature. Position the calibration rigs to allow movement of the burner from the test rig position to either the heat flux or temperature position with minimal difficulty.

(ii) Calorimeter.

The calorimeter must be a total heat flux, foil type Gardon Gage of an appropriate range such as 0-20 Btu/ft$^2$-sec (0-22.7 W/cm$^2$), accurate to ±3% of the indicated reading. The heat flux calibration method must be in accordance with paragraph VI(b)(7) of this appendix.

(iv) Thermocouples.

Provide seven ⅛-inch (3.2 mm) ceramic packed, metal sheathed, type K (Chromel-alumel), grounded junction thermocouples with a nominal 24 American Wire Gauge (AWG) size conductor for calibration. Attach the thermocouples to a steel angle bracket to form a thermocouple rake for placement in the calibration rig during burner calibration.

(5) Backface Calorimeters.

Mount two total heat flux Gardon type calorimeters behind the insulation test specimens on the back side (cold) area of the test specimen mounting frame. Position the calorimeters along the same plane as the burner cone centerline, at a distance of 4 inches (102 mm) from the vertical centerline of the test frame.

(i) The calorimeters must be a total heat flux, foil type Gardon Gage of an appropriate range such as 0-5 Btu/ft$^2$-sec (0-5.7 W/cm$^2$), accurate to ±3% of the indicated reading. The heat flux calibration method must comply with paragraph VI(b)(7) of this appendix.

(6) Instrumentation.

Provide a recording potentiometer or other suitable calibrated instrument with an appropriate range to measure and record the outputs of the calorimeter and the thermocouples.

(7) Timing Device.

Provide a stopwatch or other device, accurate to ±1%, to measure the time of application of the burner flame and burnthrough time.

(c) Test Specimens.

(1) Specimen preparation. Prepare a minimum of three specimen sets of the same construction and configuration for testing.

(2) Insulation Blanket Test Specimen.

(i) For batt-type materials such as fiberglass, the constructed, finished blanket specimen assemblies must be 32 inches wide by 36 inches long (81.3 by 91.4 cm), exclusive of heat sealed film edges.

(3) Construction. Make each of the specimens tested using the principal components (i.e., insulation, fire barrier material if used, and moisture barrier film) and assembly processes (representative seams and closures).

(i) Fire Barrier Material.

If the insulation blanket is constructed with a fire barrier material, place the fire barrier material in a manner reflective of the installed arrangement. For example, if the material will be placed on the outboard side of the insulation material, inside the moisture film, place it the same way in the test specimen.

(v) Conditioning.

Condition the specimens at 70°±5° F. (21°±2° C.) and 55%±10% relative humidity for a minimum of 24 hours prior to testing.

(f) Test Procedure.

(1) Secure the two insulation blanket test specimens to the test frame. The insulation blankets should be attached to the test rig center vertical former using four spring clamps . . . (according to the criteria of paragraph (c)(4) or (c)(4)(i) of this part of this appendix).

(2) Ensure that the vertical plane of the burner cone is at a distance of 4±0.125 inch (102±3 mm) from the outer surface of the horizontal stringers of the test specimen frame, and that the burner and test frame are both situated at a 30° angle with respect to vertical.

(3) When ready to begin the test, direct the burner away from the test position to the warm-up position so that the flame will not impinge on the specimens prematurely. Turn on and light the burner and allow it to stabilize for 2 minutes.

(4) To begin the test, rotate the burner into the test position and simultaneously start the timing device.

(5) Expose the test specimens to the burner flame for 4 minutes and then turn off the burner. Immediately rotate the burner out of the test position.

(6) Determine (where applicable) the burnthrough time, or the point at which the heat flux exceeds 2.0 Btu/ft$^2$-sec (2.27 W/cm$^2$).

(g) Report.

(1) Identify and describe the specimen being tested.

(2) Report the number of insulation blanket specimens tested.

(3) Report the burnthrough time (if any), and the maximum heat flux on the back face of the insulation blanket test specimen, and the time at which the maximum occurred.

(h) Requirements.

(1) Each of the two insulation blanket test specimens must not allow fire or flame penetration in less than 4 minutes.

(2) Each of the two insulation blanket test specimens must not allow more than 2.0 Btu/ft$^2$-sec (2.27 W/cm$^2$) on the cold side of the insulation specimens at a point 12 inches (30.5 cm) from the face of the test rig.

Although the various aspects of the fire barrier laminate have been illustrated above by reference to examples and preferred embodiments, it will be appreciated that the scope of the present subject matter is defined not by the foregoing description but by the following claims properly construed under principles of patent law.

What is claimed is:

1. A fire barrier laminate that passes the flame propagation and burn-through resistance test protocols of 14 CFR §§25.856(a) and (b), Appendix F, Parts VI and VII comprising:
   a. a first film layer;
   b. a support layer on top of the first film layer;
   c. a non-fibrous fire barrier layer on top of the support layer; and
   d. optionally, a second film layer on top of the non-fibrous fire barrier layer,
   e. wherein the non-fibrous fire barrier layer comprises at least one inorganic pigment material; and
   f. wherein the at least one inorganic pigment material is silica, alumina, borosilicate or mica; and
   g. wherein the mica is natural or synthetic, including, without limitation, muscovite, phlogopite, vermiculite, suzorite, biotite, and may include synthetic micas such as fluorophlogopite.

2. The fire barrier laminate of claim 1, wherein the first film layer is on top of a scrim.

3. The fire barrier laminate of any of claim 1, wherein the non-fibrous fire barrier layer comprises an adhesive in addition to the at least one inorganic pigment material.

4. The fire barrier laminate of claim 3, wherein the at least one inorganic pigment material is a metal oxide-coated inorganic platelet material.

5. The fire barrier laminate of claim 4, wherein the at least one inorganic pigment material is metal oxide-coated mica platelets.

6. The fire barrier laminate of claim 4, wherein the metal oxide coating is selected from the group consisting of titanium oxide, iron oxide, chromium oxide, tin oxide, silicon oxide, cobalt oxide, antimony oxide and any combination thereof.

7. The fire barrier laminate of claim 3, wherein the adhesive is a pressure sensitive adhesive.

8. The fire barrier laminate of claim 7, wherein the pressure sensitive adhesive is a silicone pressure sensitive adhesive.

9. The fire barrier laminate of claim 1, wherein there is an adhesive layer between the non-fibrous fire barrier layer and the second film layer.

10. The fire barrier laminate of claim 9, wherein the adhesive layer is formed using a formulation comprising an adhesive and a solvent.

11. The fire barrier laminate of claim 9, wherein the adhesive is a pressure sensitive adhesive.

12. The fire barrier laminate of claim 11, wherein the pressure sensitive adhesive is a silicone pressure sensitive adhesive.

13. A fire barrier laminate that passes the flame propagation and burn-through resistance test protocols of 14 CFR §§25.856(a) and (b), Appendix F, Parts VI and VII comprising:
   a. a first film layer;
   b. a non-fibrous fire barrier layer proximate to the first film layer, the non-fibrous fire barrier layer comprising at least one inorganic pigment and an adhesive;
   c. optionally, a support layer between the first film layer and the non-fibrous fire barrier layer; and
   d. optionally, a second film layer on top of the non-fibrous fire barrier layer.

14. The fire barrier laminate of claim 13, wherein the at least one inorganic pigment material has a diameter of from about 1 micron to about 300 microns.

15. The fire barrier laminate of claim 13, wherein the at least one inorganic pigment material is a metal oxide-coated inorganic platelet material.

16. The fire barrier laminate of claim 15, wherein the at least one inorganic pigment material is metal oxide-coated mica platelets.

17. The fire barrier laminate of claim 15, wherein the metal oxide coating is selected from the group consisting of titanium oxide, iron oxide, chromium oxide, tin oxide, silicon oxide, cobalt oxide, antimony oxide and any combination thereof.

18. A fire barrier laminate that passes the flame propagation and burn-through resistance test protocols of 14 CFR §§25.856(a) and (b), Appendix F, Parts VI and VII comprising:
   a. a first film layer;
   b. a support layer between the first film layer and a non-fibrous fire barrier layer;
   c. a non-fibrous fire barrier layer coated on the first film later, the non-fibrous fire barrier layer comprising at least one inorganic platelet, a binder and one or more functional fillers;
   d. a second film layer on top of the support layer;
   e. wherein the at least one inorganic platelet is mica; and
   f. wherein the mica is natural or synthetic, including, without limitation, muscovite, phlogopite, vermiculite, suzorite, biotite, and may include synthetic micas such as fluorophlogopite; and
   g. wherein the binder is one or a combination of adhesives, colloidal dispersions of alumina, silica, zirconia, and mixtures thereof or acrylic latex, (meth)acrylic latex, phenolic resins, copolymers of styrene and butadiene, vinylpyridine, acrylonitrile, copolymers of acrylonitrile and styrene, vinyl chloride, polyurethane, copolymers of vinyl acetate and ethylene, polyamides, silicones, unsaturated polyesters, epoxy resins, polyvinyl esters (such as polyvinylacetate or polyvinylbutyrate latexes) or similar materials;
   h. wherein the one or more functional filler(s) are selected from but are not be limited to, carbon fibers carbon nanotubes, non-platelet clays (such as attapulgite, kyanite, palygorskite, silimanite, or andalucite), fumed silica, boron nitride, cordierite and the like, finely divided metal oxides, which may comprise at least one of pyrogenic silicas, arc silicas, low-alkali precipitated silicas, fumed silica, silicon dioxide aerogels, aluminum oxides, titania, calcia, magnesia, potassia, and mixtures thereof.

19. A fire barrier laminate that passes the flame propagation and burn-through resistance test protocols of 14 CFR §§25.856(a) and (b), Appendix F, Parts VI and VII comprising:
   a. a first film layer;
   b. a support layer between the first film layer and a non-fibrous fire barrier layer;
   c. a non-fibrous fire barrier layer coated on the first film layer, the non-fibrous fire barrier layer comprising at least one inorganic platelet and an adhesive; and
   d. a second film layer on top of the support layer;
   e. wherein the at least one inorganic platelet is silica, alumina, borosilicate and mica; and wherein the mica is natural or synthetic, including, without limitation, muscovite, phlogopite, vermiculite, suzorite, biotite, and may include synthetic micas such as fluorophlogopite; and
   f. wherein the at least one inorganic platelet is coated with a metal oxide chosen from the group consisting of titanium oxide, iron oxide, chromium oxide, tin oxide, silicon oxide, cobalt oxide, antimony oxide or any combination thereof; and
   g. wherein the total weight of the fire barrier laminate does not exceed 120 grams per square meter.

* * * * *